United States Patent
Gotoh et al.

(10) Patent No.: US 8,264,723 B2
(45) Date of Patent: Sep. 11, 2012

(54) PRINTING APPARATUS, PRINTING SYSTEM, AND COMPUTER PROGRAM PRODUCT

(75) Inventors: Hiroshi Gotoh, Tokyo (JP); Takeshi Yoshizumi, Tokyo (JP); Hozumi Yonezawa, Tokyo (JP); Minako Kazume, Kanagawa (JP); Takahiro Hirakawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 625 days.

(21) Appl. No.: 12/476,540

(22) Filed: Jun. 2, 2009

(65) Prior Publication Data

US 2009/0303534 A1   Dec. 10, 2009

(30) Foreign Application Priority Data

Jun. 10, 2008 (JP) .................................. 2008-152115

(51) Int. Cl.
*G06F 3/12* (2006.01)
(52) U.S. Cl. ................ 358/1.15; 358/1.1; 358/1.9
(58) Field of Classification Search .................. 358/1.1, 358/1.15
See application file for complete search history.

(56) References Cited

U.S. PATENT DOCUMENTS

| | | | |
|---|---|---|---|
| 2007/0024895 A1* | 2/2007 | Clark | ........................ 358/1.15 |
| 2009/0066989 A1 | 3/2009 | Kazume | |
| 2009/0091783 A1 | 4/2009 | Kazume et al. | |
| 2009/0310175 A1 | 12/2009 | Yoshizumi et al. | |

FOREIGN PATENT DOCUMENTS

| | | |
|---|---|---|
| JP | 2002-189581 | 7/2002 |
| JP | 2003-271347 | 9/2003 |
| JP | 3958016 | 5/2007 |
| JP | 2007-272832 | 10/2007 |
| JP | 2007-272833 | 10/2007 |
| JP | 2009-69948 | 4/2009 |
| JP | 2009-101679 | 5/2009 |
| JP | 2009-104581 | 5/2009 |
| JP | 2009-104582 | 5/2009 |
| JP | 2009-104583 | 5/2009 |
| JP | 2009-217467 | 9/2009 |
| JP | 2009-238206 | 10/2009 |
| JP | 2009-297994 | 12/2009 |

OTHER PUBLICATIONS

U.S. Appl. No. 12/429,312, filed Apr. 24, 2009, Yoshizumi, et al.

* cited by examiner

*Primary Examiner* — King Poon
*Assistant Examiner* — Iriana Cruz
(74) *Attorney, Agent, or Firm* — Oblon, Spivak, McClelland, Maier & Neustadt, L.L.P.

(57) ABSTRACT

A printing apparatus performs a printing process for a printing job including at least one print data and a series of process commands from a host apparatus. A session setup unit sets up a session with the host apparatus and other printing apparatus. A status obtaining unit obtains a status of the other printing apparatus that is in session with the printing apparatus. Upon performing the print process, a job synchronizing unit maintains a synchronization of the print job with the other printing apparatus that is in session with the printing apparatus.

11 Claims, 26 Drawing Sheets

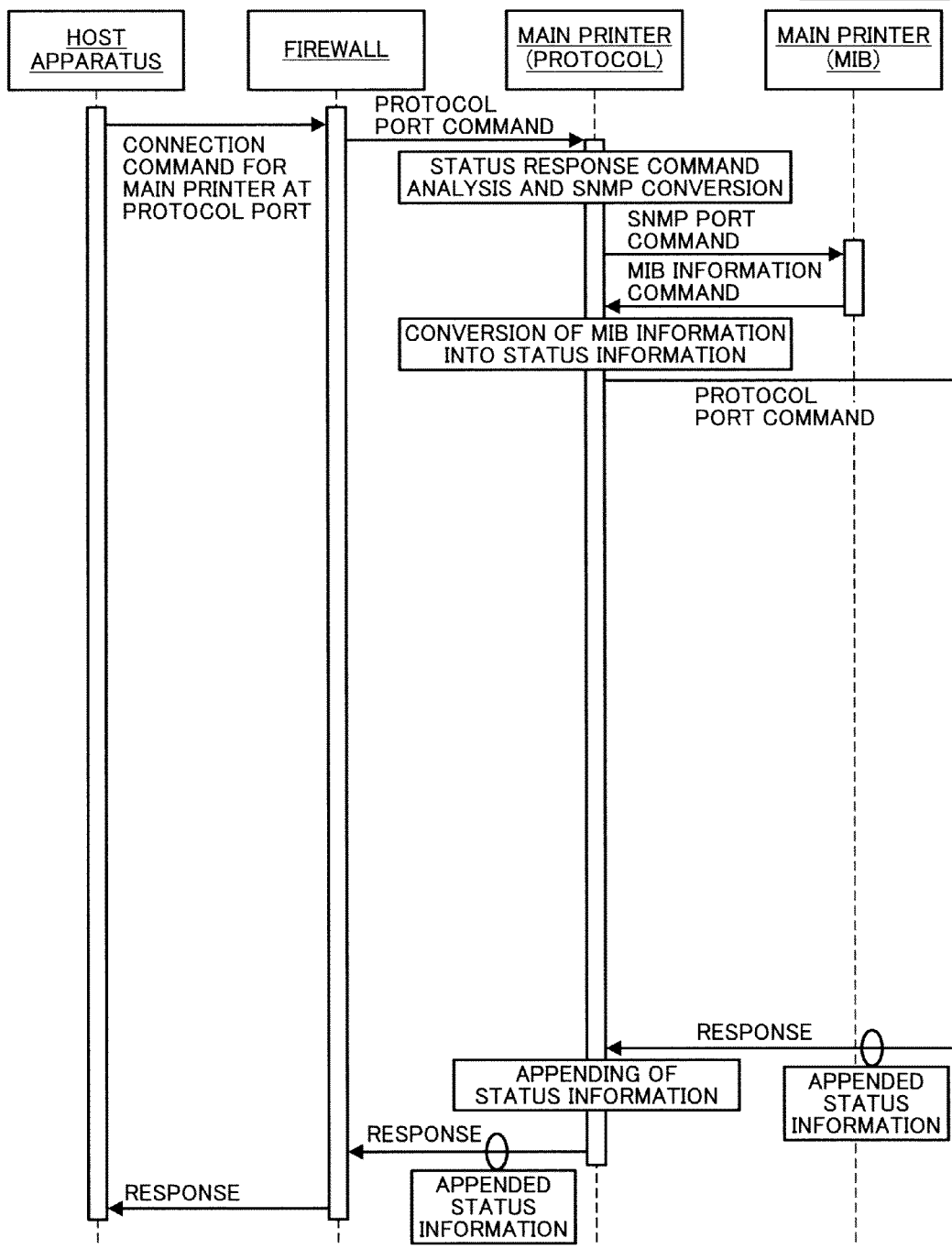

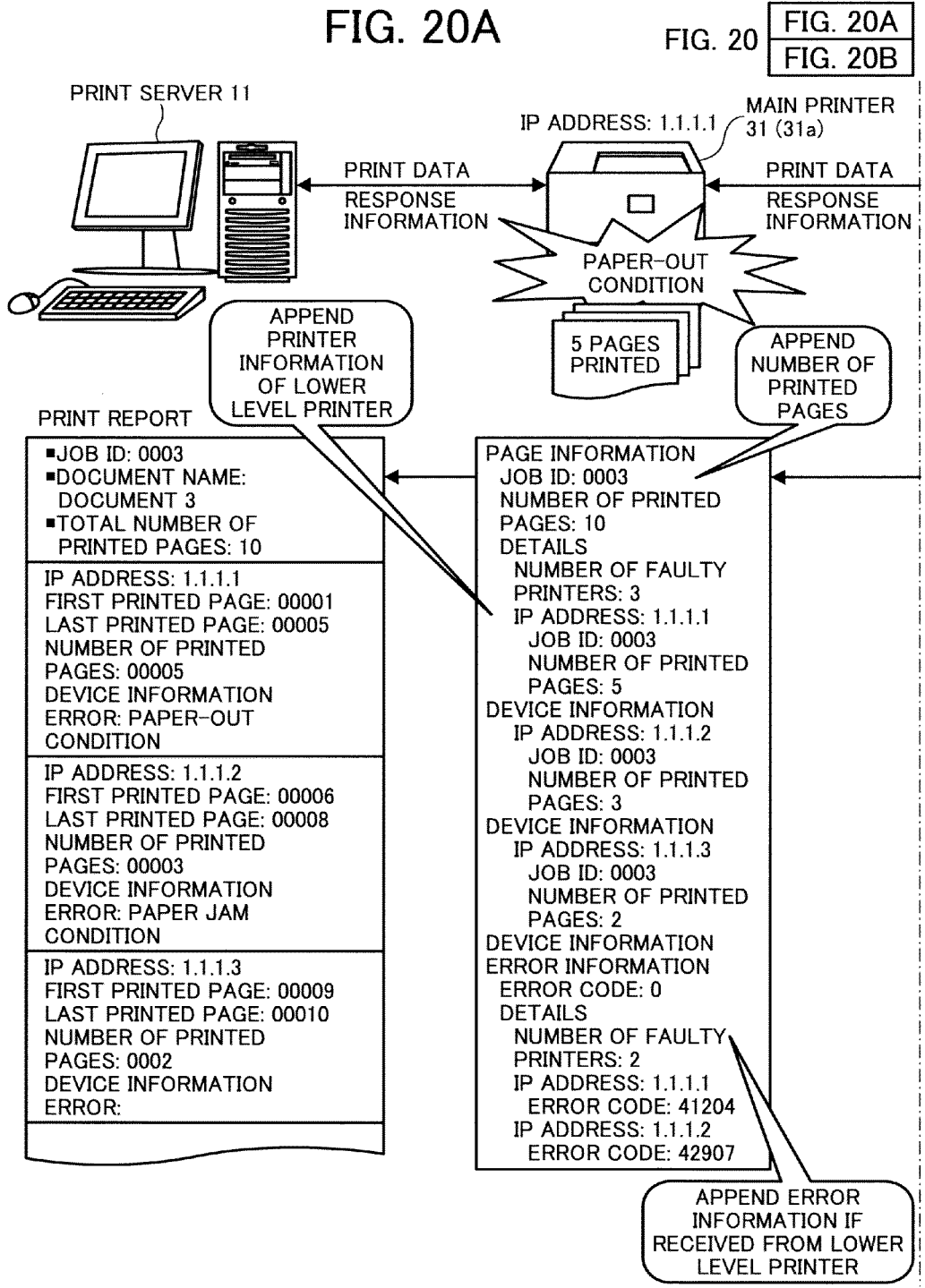

FIG. 22

PRINT REPORT

- JOB ID: 0003
- DOCUMENT NAME: DOCUMENT 3
- TOTAL NUMBER OF PRINTED PAGES: 10

IP ADDRESS: 1.1.1.1
FIRST PRINTED PAGE: 00001
LAST PRINTED PAGE: 00005
NUMBER OF PRINTED PAGES: 00005
DEVICE INFORMATION: STATUS: CAUTIONING
    DETAILS: TONER-NEAR-END CONDITION
    FEED TRAY 1: A4 100 SHEETS
    FEED TRAY 2: A5 50 SHEETS
    CATCH TRAY 1:
    TONER: TONER-NEAR-END CONDITION
ERROR: PAPER-OUT CONDITION

IP ADDRESS: 1.1.1.2
FIRST PRINTED PAGE: 00006
LAST PRINTED PAGE: 00008
NUMBER OF PRINTED PAGES: 00003
DEVICE INFORMATION: STATUS:
    DETAILS:
    FEED TRAY 1:
    FEED TRAY 2:
    CATCH TRAY 1:
    TONER:
ERROR: PAPER JAM CONDITION

IP ADDRESS: 1.1.1.3
FIRST PRINTED PAGE: 00009
LAST PRINTED PAGE: 00010
NUMBER OF PRINTED PAGES: 0002
DEVICE INFORMATION: STATUS:
    DETAILS:
    FEED TRAY 1:
    FEED TRAY 2:
    CATCH TRAY 1:
    TONER:
ERROR:

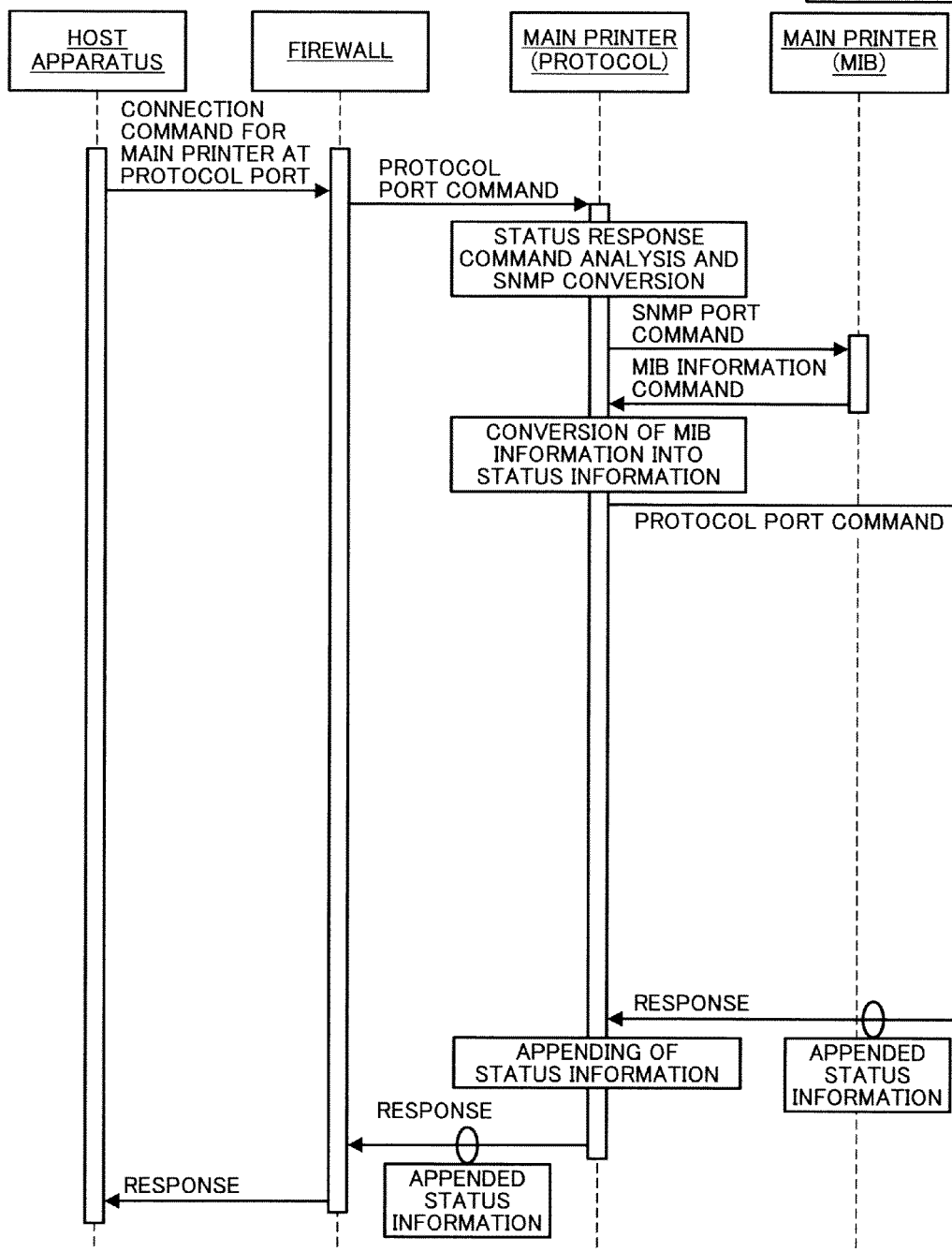

PRINTING APPARATUS, PRINTING SYSTEM, AND COMPUTER PROGRAM PRODUCT

CROSS-REFERENCE TO RELATED APPLICATIONS

The present application claims priority to and incorporates by reference the entire contents of Japanese priority document 2008-152115 filed in Japan on Jun. 10, 2008.

BACKGROUND OF THE INVENTION

1. Field of the Invention

The present invention relates to a network printing technology.

2. Description of the Related Art

In recent years, a network printing system has been actively developed, which performs a printing job via a network. For example, Japanese Patent Application Laid-open No. 2003-271347 discloses a network printing system in which printing is performed at a printer connected to a network such as the Internet.

FIG. 25 is a schematic diagram for explaining a conventional network printing system. The network printing system in FIG. 25 is configured as an extranet environment in which an intranet environment 200 is connected to an intranet environment 300 via a network 400. In such a configuration, it is possible to perform a print job at a printer arranged in the intranet environment 300 by giving a printing instruction from a host computer (print server) arranged in the intranet environment 200, and vice versa.

However, during a printing process, there is a possibility that an error such as a paper-out condition, a paper jam condition, or a toner empty condition occurs in the printer thereby causing interruption in the printing process. If the host computer is not notified about such an error, then there is a possibility that the problem is left unattended.

Meanwhile, there is also a demand for a functionality by which it is possible to obtain the status of devices arranged in a printing system.

SUMMARY OF THE INVENTION

It is an object of the present invention to at least partially solve the problems in the conventional technology.

According to one aspect of the present invention, there is provided a printing apparatus that performs a printing process for a printing job including at least one print data and a series of process commands from a host apparatus. The printing apparatus includes a session setup unit that sets up a session with the host apparatus and other printing apparatus; a status obtaining unit that obtains an apparatus status of the other printing apparatus that is in session with the printing apparatus; and a job synchronizing unit that maintains, upon performing the print process, a synchronization of the print job with the other printing apparatus that is in session with the printing apparatus.

Furthermore, according to another aspect of the present invention, there is provided a printing system in which at least two printing apparatuses are connected to a host apparatus via a network. Each of the printing apparatuses performs a printing process for a printing job including at least one print data and a series of process commands from the host apparatus. The printing system includes a session setup unit that sets up a session between the host apparatus and all printing apparatuses connected to the host apparatus via the network; a status obtaining unit that obtains an apparatus status of each of the printing apparatuses that are in session with the host apparatus; and a job synchronizing unit that maintains, when a first printing apparatus is printing the print process, a synchronization of the print job with a second printing apparatus that is in session with the first printing apparatus.

Moreover, according to still another aspect of the present invention, there is provided a computer program product comprising a computer-usable medium having computer-readable program codes embodied in the medium for controlling a printing apparatus that performs a printing process for a printing job including at least one print data and a series of process commands from a host apparatus. The program codes when executed cause a computer to execute setting up a session with the host apparatus and other printing apparatus; obtaining an apparatus status of the other printing apparatus that is in session with the printing apparatus; and job synchronizing including, upon performing the print process, maintaining a synchronization of the print job with the other printing apparatus that is in session with the printing apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 22 is a diagram of an exemplary print report generated during the print report generating process;

DETAILED DESCRIPTION OF THE PREFERRED EMBODIMENTS

Exemplary embodiments of the present invention are described in detail below with reference to the accompanying drawings. The present invention is not limited to these exemplary embodiments.

A laser printer or a multifunction peripheral (MFP) is used as a printing apparatus in the following embodiments.

Figure 1:
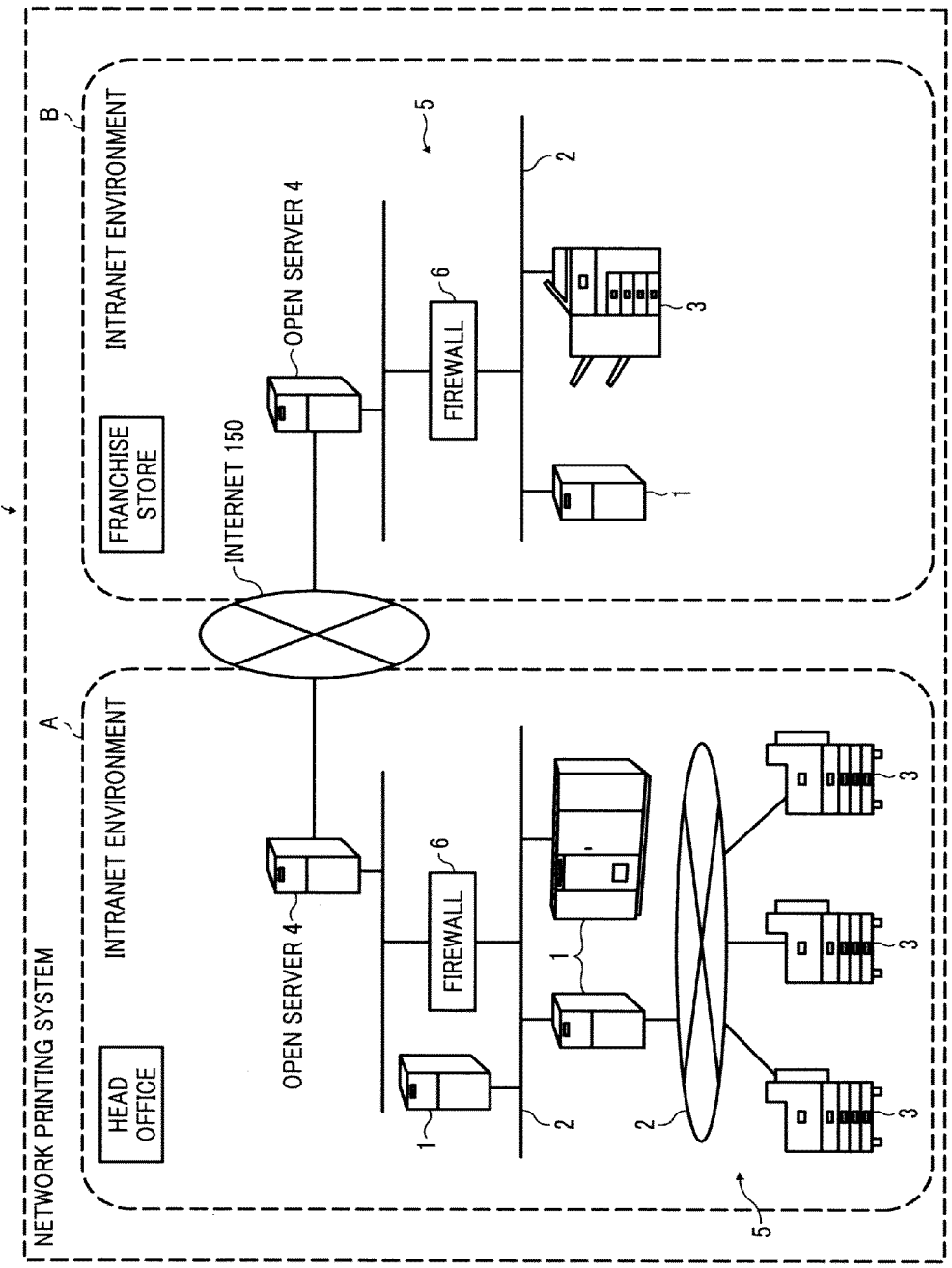
FIG. 1 is a schematic diagram of a network printing system according to a first embodiment of the present invention.

FIG. 1 is a schematic diagram of a network printing system 100 according to a first embodiment of the present invention. The network printing system 100 is configured as an extranet environment in which an intranet environment A is connected to an intranet environment B via an external network 150 such as the Internet. Each of the intranet environments A and B is assumed to be, although not limited to, an in-house network environment of a business establishment configured based on Internet technology. For example, the intranet environment A is an in-house network environment of a head office of a convenience store chain, while the intranet environment B is an in-house network environment of a franchise store of the convenience store chain. The intranet environment A includes an internal network system 5 that is connected to an open server 4 such as a World Wide Web (WWW) server via a firewall 6. The internal network system 5 is built on a client-server architecture in which a plurality of server computers 1 (hereinafter, "servers 1") and a plurality of client devices 3 are interconnected via a local network 2 such as a local area network (LAN). In the example shown in FIG. 1, the client devices 3 are assumed to be, although not limited to, printers. The firewall 6 monitors data packets that are communicated between the internal network system 5 and the external network 150 via the open server 4. From the security perspective of the internal network system 5, the firewall 6 determines whether to allow or to block the communication of each data packet based on predetermined conditions.

The intranet environment B has an identical configuration to the configuration of the intranet environment A, except that the number of servers 1 or the number of client devices 3 is not necessarily same.

Meanwhile, instead of using the external network 150, a dedicated communication line can be used to connect the intranet environment A to the intranet environment B.

Moreover, the local network 2 can be configured to be compatible to any one of wire communication, wireless infrared communication, wireless radio communication, optical fiber communication, and the like.

Figure 2:
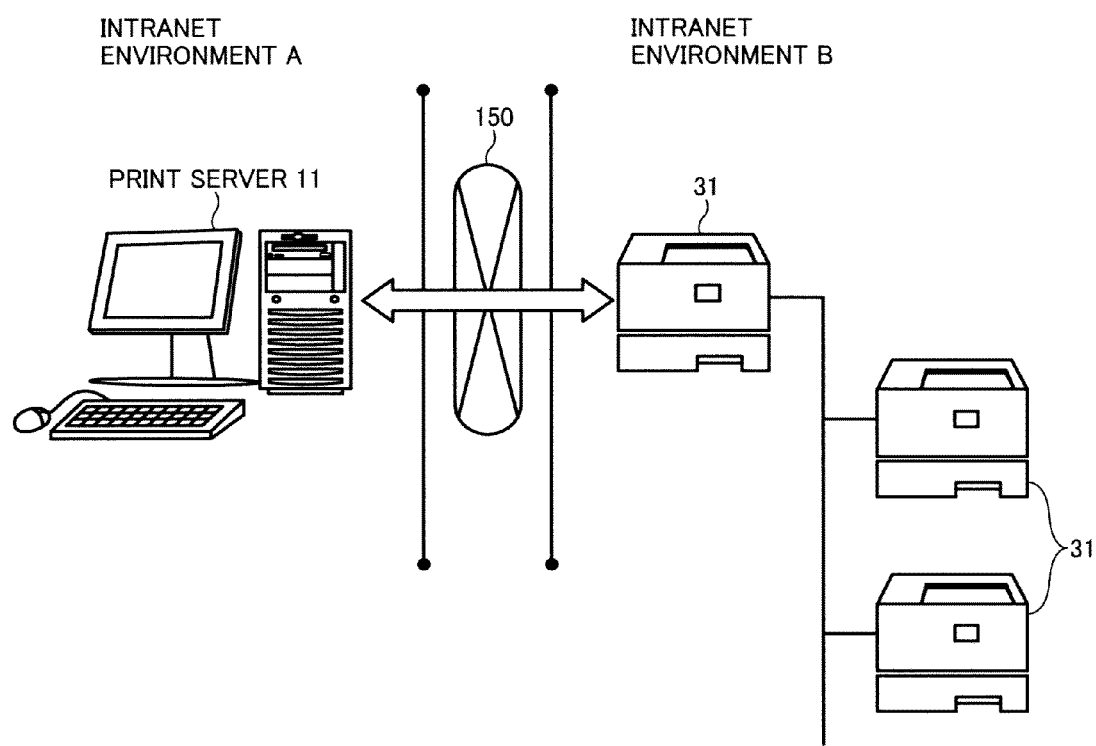
FIG. 2 is a schematic diagram for explaining an exemplary configuration of the network printing system.

In the network printing system 100, it is possible to carry out print jobs at a printer arranged in the intranet environment B by giving a printing instruction by using a server arranged in the intranet environment A, and vice versa. For example, as shown in FIG. 2, a printing instruction can be sent to a uniquely-determined printer 31, which is one of a plurality of printers 31 arranged in the intranet environment B, from a print server 11, which is one of the servers 1 arranged in the intranet environment A.

Figure 3:
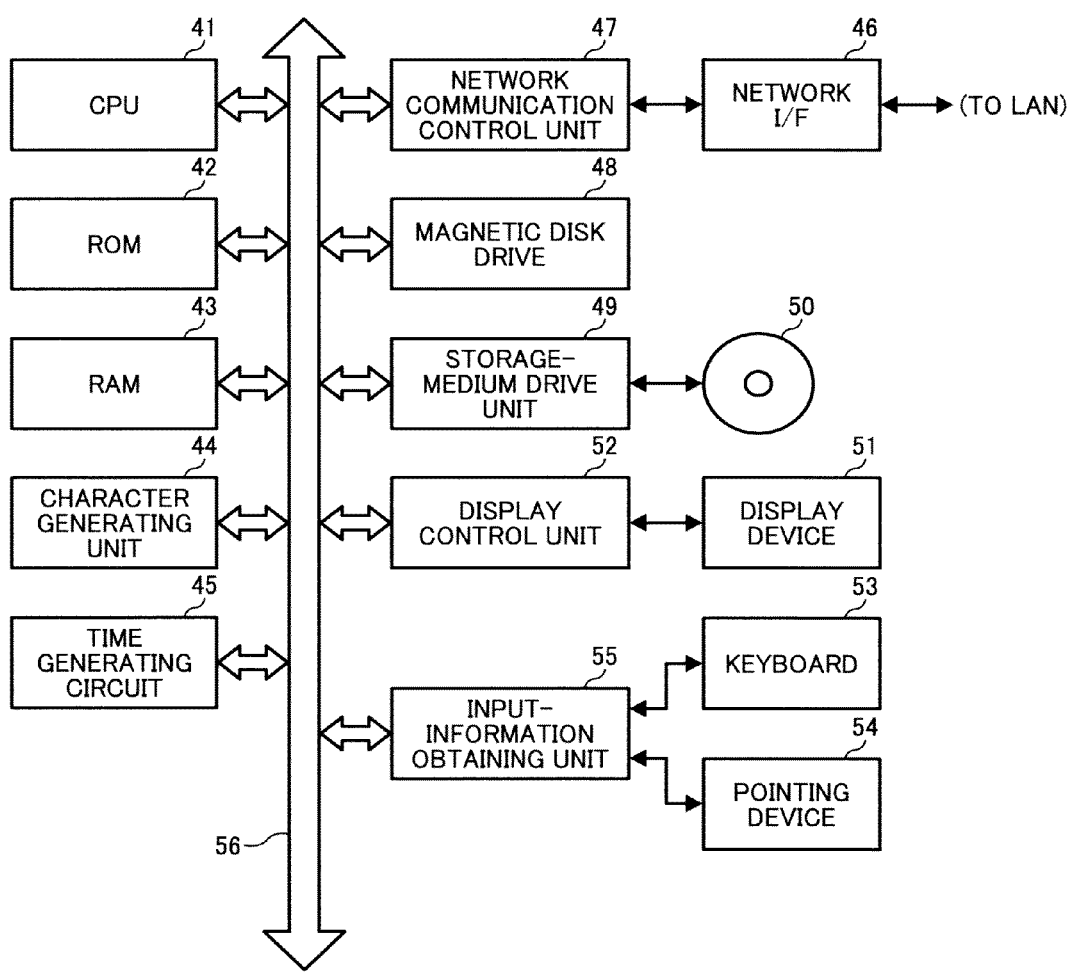
FIG. 3 is a block diagram for explaining an exemplary hardware configuration of a print server in the network printing system.

FIG. 3 is a block diagram for explaining an exemplary hardware configuration of the print server 11. The print server 11 includes a central processing unit (CPU) 41, a read only memory (ROM) 42, a random access memory (RAM) 43, a character generating unit 44, a time generating circuit 45, a network communication control unit 47, a magnetic disk drive 48, a storage-medium drive unit 49, a display control unit 52, and an input-information obtaining unit 55. An internal bus 56 is used to interconnect the abovementioned hardware components. Moreover, a network interface (I/F) 46 is arranged to interface the print server 11 to the local network 2.

The CPU 41 controls the operations of the print server 11. The ROM 42 is used to store application programs and data necessary for booting the print server 11. The RAM 43 functions as a work area for the CPU 41. The character generating unit 44 generates graphic characters or display data. The time generating circuit 45 generates current time and date.

The network communication control unit 47 performs communication control processing of predetermined protocol suites. As a result, a variety of data can be communicated between the print server 11 and the servers 1 or the client devices 3 in any one of the intranet environments A and B. For example, the print server 11 can send print data to the uniquely-determined printer 31 or receive the status of ongoing print jobs from the uniquely-determined printer 31.

The magnetic disk drive 48 is used to store a variety of application programs that run on an operating system (OS) of the print server 11 and a variety of data such as work data, file data, and image data. One of the application programs stored in the magnetic disk drive 48 is a print data transmission program that is executed to send print data to a printer. The storage-medium drive unit 49 reads a compatible removable storage medium 50 and obtains a variety of application programs or data stored therein.

When the print server 11 is turned ON, the CPU 41 executes a loader routine stored in the ROM 42 and loads the OS from the magnetic disk drive 48 into the RAM 43. The OS manages the hardware components and the application programs in the print server 11. Subsequently, according to user instructions, various functions such as executing application programs, reading information, and storing information are performed. An application program can be a computer program that runs in the OS or that performs partial execution of any of the processing functions described below, or that is included in a set of program files configuring an application software or the OS. Meanwhile, the removable storage medium 50 can be a compact disk read only memory (CD-ROM), a flexible disk (FD), a CD recordable (CD-R), a CD rewritable (CD-RW), a digital versatile disk (DVD), a semiconductor storage medium, and the like.

Generally, an application program is installed in the magnetic disk drive 48 from the removable storage medium 50. However, it is also possible to directly execute an application program from the removable storage medium 50. Moreover, it is also possible to download an application program via the network I/F 46 and install it in the magnetic disk drive 48.

The display control unit 52 controls the contents of an operation screen that is displayed on a display device 51 such as a cathode ray tube.

The input-information obtaining unit 55 obtains user instructions and information input from a keyboard 53 or a pointing device 54 such as a mouse.

In the print server 11, a specific application program is executed to generate printing document information. Meanwhile, the printing document information can also be obtained by using the removable storage medium 50 or obtained through the external network 150 in the form of an attachment to an electronic mail. The printing document information is stored in the magnetic disk drive 48.

Figure 4:
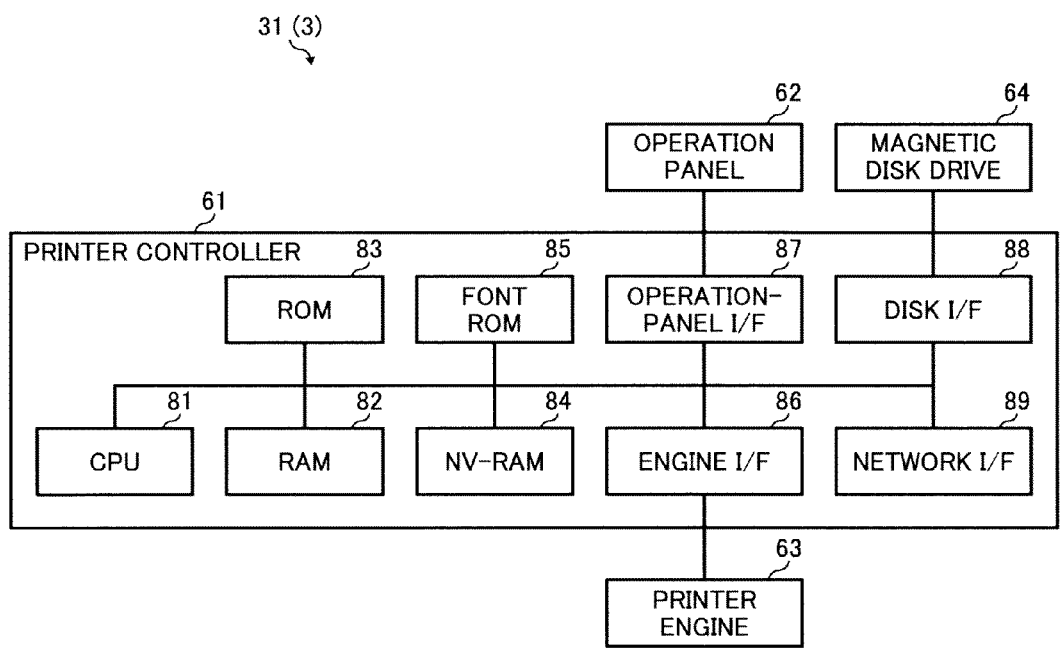
FIG. 4 is a block diagram for explaining an exemplary hardware configuration of a printer in the network printing system.

FIG. 4 is a block diagram for explaining an exemplary hardware configuration of each of the printers 31. Each of the printers 31 includes a printer controller 61, an operation panel 62, a printer engine 63, and a magnetic disk drive 64. The printer controller 61 functions as a motherboard for managing the hardware components and the printing operations of the corresponding printer 31.

More particularly, based on the current print mode and a printer control code, which is included in an instruction received from a print server (e.g., the print server 11), the printer controller 61 converts print data into image data and outputs the image data to the printer engine 63. The printer controller 61 has a modular configuration that includes a CPU 81, a RAM 82, a ROM 83, a non volatile RAM (NV-RAM) 84, a font ROM 85, an engine I/F 86, an operation-panel I/F 87, a disk I/F 88, and a network I/F 89. The CPU 81 controls the functioning of the corresponding printer 31. The ROM 83 is used to store printer-specific information. The NV-RAM 84 is used to store information that needs to be retained even when power is turned OFF. The font ROM 85 is used to store a plurality of printing fonts. The engine I/F 86 interfaces the printer controller 61 to the printer engine 63. The operation-panel I/F 87 interfaces the printer controller 61 to the operation panel 62. The disk I/F 88 interfaces the printer controller 61 to the magnetic disk drive 64.

The RAM 82 functions as a work area for the CPU 81, which is provided with a data buffer area for temporarily storing received data and with an image buffer area for temporarily storing images.

The printer controller 61 sends a print control signal to the printer engine 63 via the engine I/F 86 and receives a status signal from the printer engine 63 via the engine I/F 86.

The network I/F 89 interfaces the corresponding printer 31 to the local network 2 such that the printer 31 can communicate print control signals, status signals, print data, and the like with the servers 1 in the intranet environment A or the intranet environment B.

A user can use the operation panel 62 to set various print settings such as status display setting, print mode setting, and printing condition setting.

The printer engine 63 forms an image by an electrophotographic process and prints the image on a recording medium such as a sheet of recording paper. More particularly, based on image data and print control information from the printer controller 61, the printer engine 63 forms an image on a photosensitive member (not shown) in an electrostatic manner and transfers the image on the recording medium.

The magnetic disk drive 64 is used to store printing document information, various information files, the OS, and a plurality of application programs executed in the OS. One of the application programs stored in the magnetic disk drive 64 is a print job program that is executed to carry out a print job.

When a printer 31 is turned ON, the CPU 81 loads the OS from the magnetic disk drive 64 into the RAM 82. The OS manages the hardware components and the application programs in the printer 31. Subsequently, according to user instructions, various functions such as executing application programs, reading information, and storing information are performed. An application program can be a computer program that runs in the OS or that performs partial execution of any of the print processing functions described below, or that is included in a set of program files configuring an application software or the OS.

Generally, an application program is installed in the magnetic disk drive 64 from a removable storage medium (not shown). However, an application program can be directly executed from the removable storage medium. Moreover, it is also possible to download an application program via the network I/F 89 and install it in the magnetic disk drive 64.

Meanwhile, instead of the magnetic disk drive 64, it is also possible to use a computer-readable storage medium such as a semiconductor memory for storing various application programs and the OS.

Given below is the description of a substitutive printing process in which one or more lower-level printers are kept ready to substitutively perform printing of print data in case a problem occurs in an upper-level printer while printing that print data.

In the example shown in FIG. 2, when the uniquely-determined printer 31 receives print data from the print server 11, the printer controller 61 of the uniquely-determined printer 31 converts the print data into image data based on the print control information and outputs the image data to the printer engine 63. A print command is issued to the printer engine 63 to start printing the image data. However, during the printing process, there is a possibility that an error such as a paper-out condition, a paper jam condition, or a toner empty condition occurs in the uniquely-determined printer 31 thereby causing interruption in the printing process. Usually, when an error occurs, the printing process is interrupted and it resumes only after a user manually solves the problem. However, in the network printing system 100, the printing process can be prevented from interruption by instructing one of the other printers 31 in the intranet environment B (hereinafter, "lower-level printers 31") to continue printing of the print data in place of the uniquely-determined printer 31. In the example shown in FIG. 2, two lower-level printers 31 are arranged with respect to the uniquely-determined printer 31. Meanwhile, the uniquely-determined printer 31 is hereinafter referred to as the main printer 31.

As described above, one of the application programs stored in the magnetic disk drive 48 is the print data transmission program. When the print data transmission program is executed in the OS of the print server 11, the CPU 41 accordingly transmits the print data to the main printer 31.

As described above, one of the application programs stored in the magnetic disk drive 48 is the print data transmission program. When the print data transmission program is executed in the OS of the print server 11, the CPU 41 accordingly transmits the print data to the main printer 31.

Figure 5:
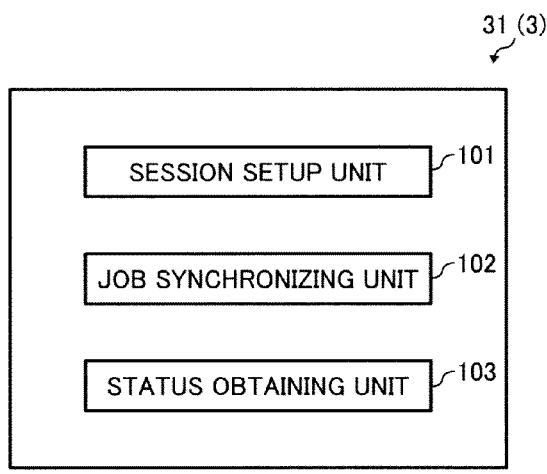
FIG. 5 is a block diagram for explaining a functional configuration of the printer implemented during a substitutive printing process.

FIG. 5 is a block diagram for explaining a functional configuration of an arbitrary one of the printers 31 implemented during the substitutive printing process. As shown in FIG. 5, the printer 31 includes a session setup unit 101, a job synchronizing unit 102, and a status obtaining unit 103. The session setup unit 101 sets up a session with the print server 11 or with another printer 31 that is connected to the printer 31 under question (hereinafter, "self printer"). When the self printer 31 is performing the printing process to print the print job that is received from the print server 11 and that includes at least one piece of print data and a series of process commands, the job synchronizing unit 102 maintains synchronization between the print job stored in the self printer 31 and the print job stored in another printer 31 that is in session with the self printer 31. The status obtaining unit 103 obtains the operating state of each of the printers 31 that are in session.

A main process in the substitutive printing process performed by the session setup unit 101 and the job synchronizing unit 102 is described below. The main process is described in details for each scene.

Figure 6:
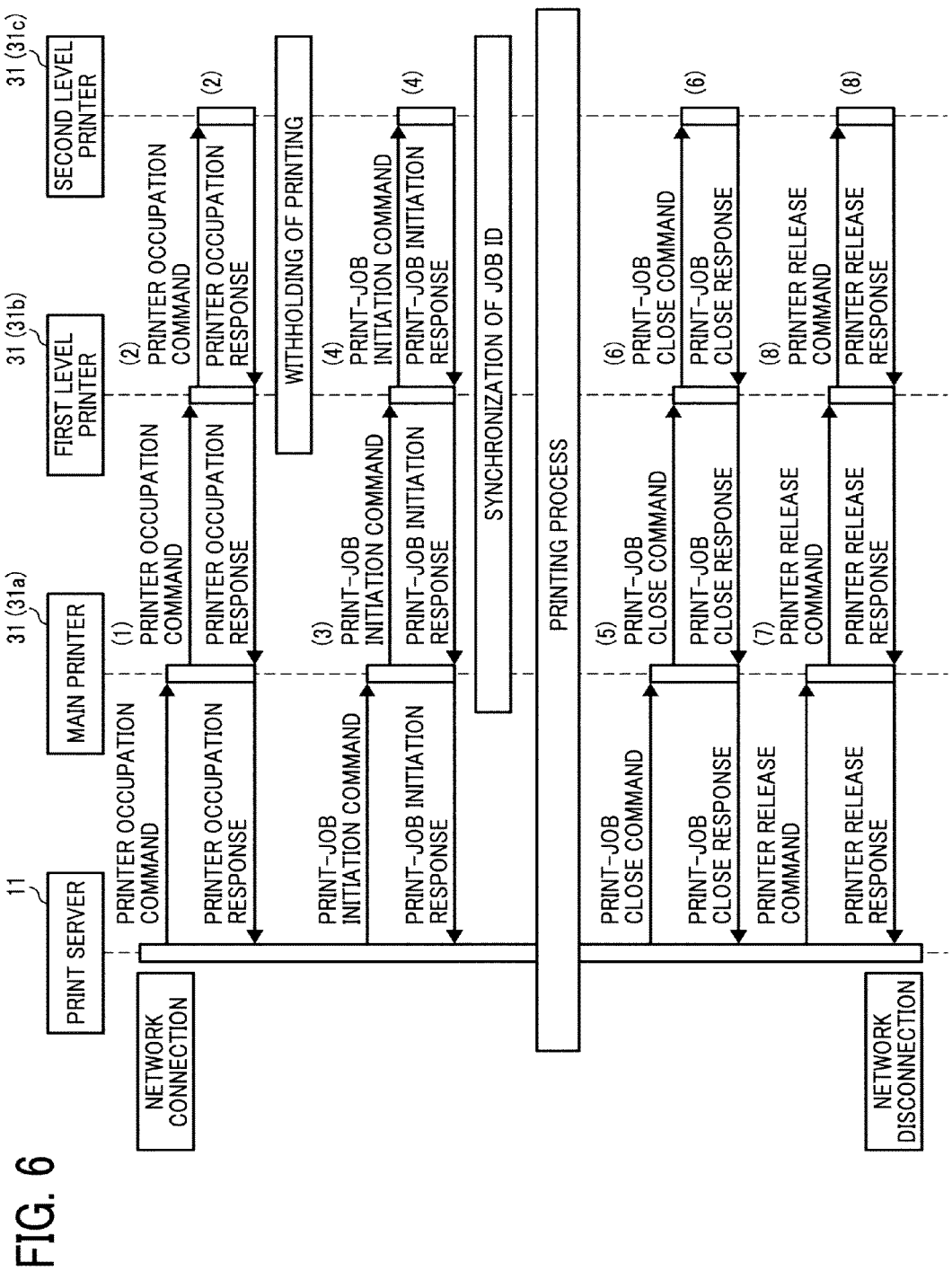
FIG. 6 is a sequence diagram of an exemplary network printing process in the network printing system.

FIG. 6 is a sequence diagram of an exemplary network printing process in the network printing system 100. In the example shown in FIG. 6, the intranet environment B includes a main printer 31a, a first level printer 31b, and a second level printer 31c. The main printer 31a, the first level printer 31b, and the second level printer 31c all have the identical configuration as the printer 31 illustrated in FIGS. 4 and 5.

As described above, a main printer is uniquely determined by the print server 11. Thus, the main printer functions as the highest level printer and receives print data directly from the print server 11. All or some of the other printers that are connected to the main printer function as lower-level printers (or sub-printers). Meanwhile, the levels of the lower-level printers can be maintained in a fixed order or can be varied for each print job. For example, it is possible to store in each printer the internet protocol (IP) address of an immediate lower-level printer to which print data or various commands are to be forwarded. In the example shown in FIG. 6, the second level printer 31c is configured as the immediate lower-level printer with respect to the first level printer 31b, while the first level printer 31b is configured as the immediate lower-level printer with respect to the main printer 31a.

In the network printing process, after the session setup unit 101 of the main printer 31a sets up a session with the print server 11 via the network, a printer occupation process is performed.

The network printing process described with reference to FIG. 6 is performed in the following sequence:

(1) The print server 11 issues a printer occupation command to the main printer 31a. As a result, the main printer 31a functions as a dedicated printer to carry out print jobs instructed only by the print server 11. The main printer 31a then forwards the printer occupation command to the first level printer 31b. As a result, the first level printer 31b also functions as a dedicated printer to carry out print jobs instructed by the print server 11. In addition to that, the main printer 31a issues a withhold command to the first level printer 31b. The withhold command instructs the first level printer 31b to withhold printing.

Figure 7:
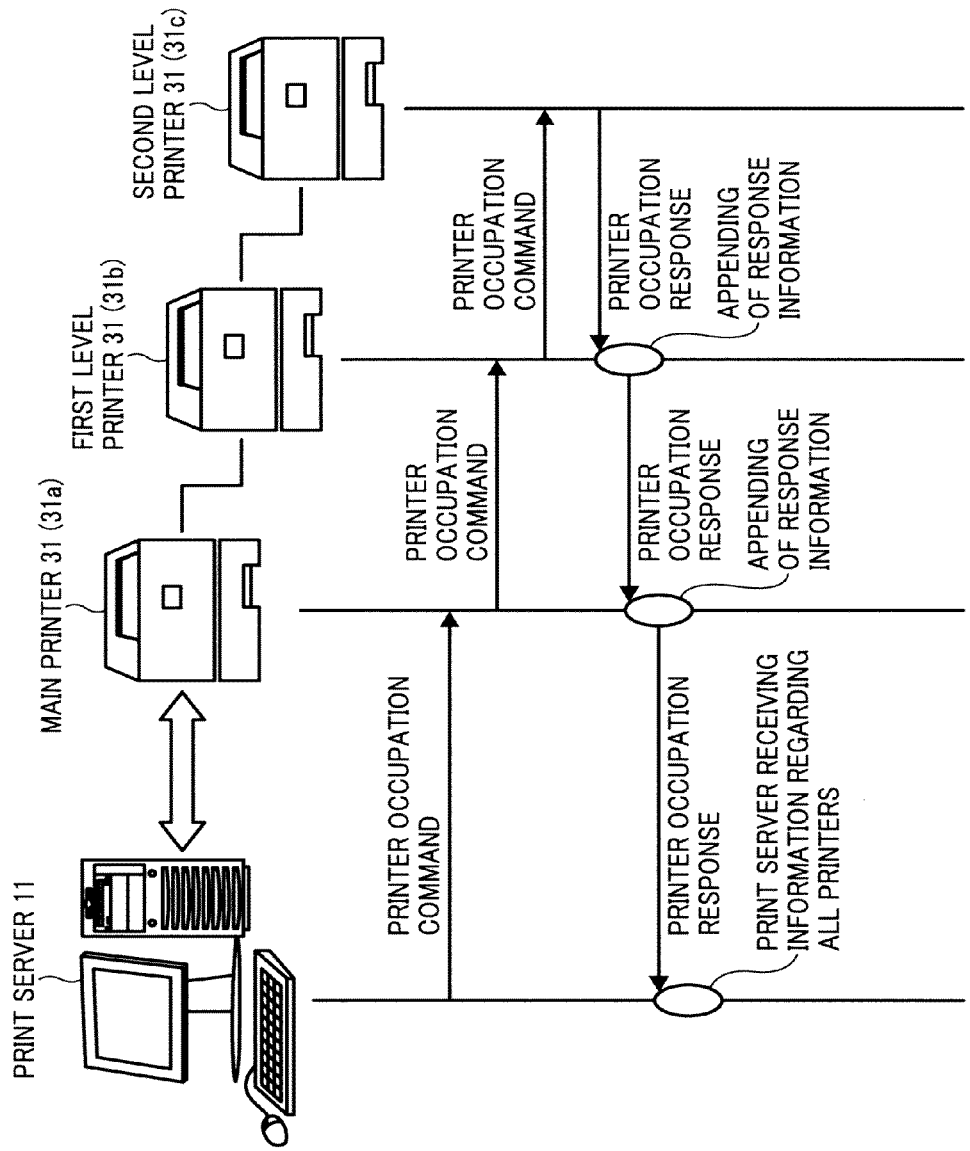
FIG. 7 is a sequence diagram of sequential appending of response information in the network printing system.

(2) Subsequently, the first level printer 31b forwards the printer occupation command to the second level printer 31c, while the first level printer 31b issues a withhold command to the second level printer 31c. Because no immediate lower-level printer is arranged with respect to the second level printer 31c, it sends back a response corresponding to the printer occupation command (hereinafter, "printer occupation response") to the first level printer 31b. The printer occupation response includes response information (e.g., IP address) of the second level printer 31c. The first level printer 31b appends the response information received from the second level printer 31c to response information of its own (see FIG. 7), and sends the resultant response information to the main printer 31a. The main printer 31a then appends the response information received from the first level printer 31b to response information of its own (see FIG. 7), and sends the resultant response information to the print server 11.

In this way, the print server 11 receives up-to-date response information from all the dedicated printers and keeps a log of the response information.

Meanwhile, as described above, the main printer 31a communicates information with the print server 11 via the external network 150 and the firewall 6. For that, either the firewall 6 can be configured to allow the communication of information or the information can be communicated in the form of an attachment to an electronic mail.

(3) The print server 11 then issues a print-job initiation command to the main printer 31a. In response, the main printer 31a performs a print-job initiation process and forwards the print-job initiation command to the first level printer 31b along with a job ID of the initiated print job.

(4) The first level printer 31b performs a print-job initiation process by using the received job ID. Performing a print-job initiation process by using the same job ID leads to synchronization of the print-job initiation process in the main printer 31a and the first level printer 31b. Subsequently, the first level printer 31b then forwards the print-job initiation command to the second level printer 31c along with the same job ID. The second level printer 31c performs a print-job initiation process by using the received job ID. Thus, the print-job initiation process is maintained in synchronization in the main printer 31a, the first level printer 31b, and the second level printer 31c. Because no immediate lower-level printer is arranged with respect to the second level printer 31c, it sends back a response corresponding to the print-job initiation command (hereinafter, "print-job initiation response") to the first level printer 31b, which in turn sends a print-job initiation response to the main printer 31a. Eventually, the main printer 31a sends a print-job initiation response to the print server 11.

Subsequently, the main printer 31a prints the print data in the initiated print job.

Figure 8:
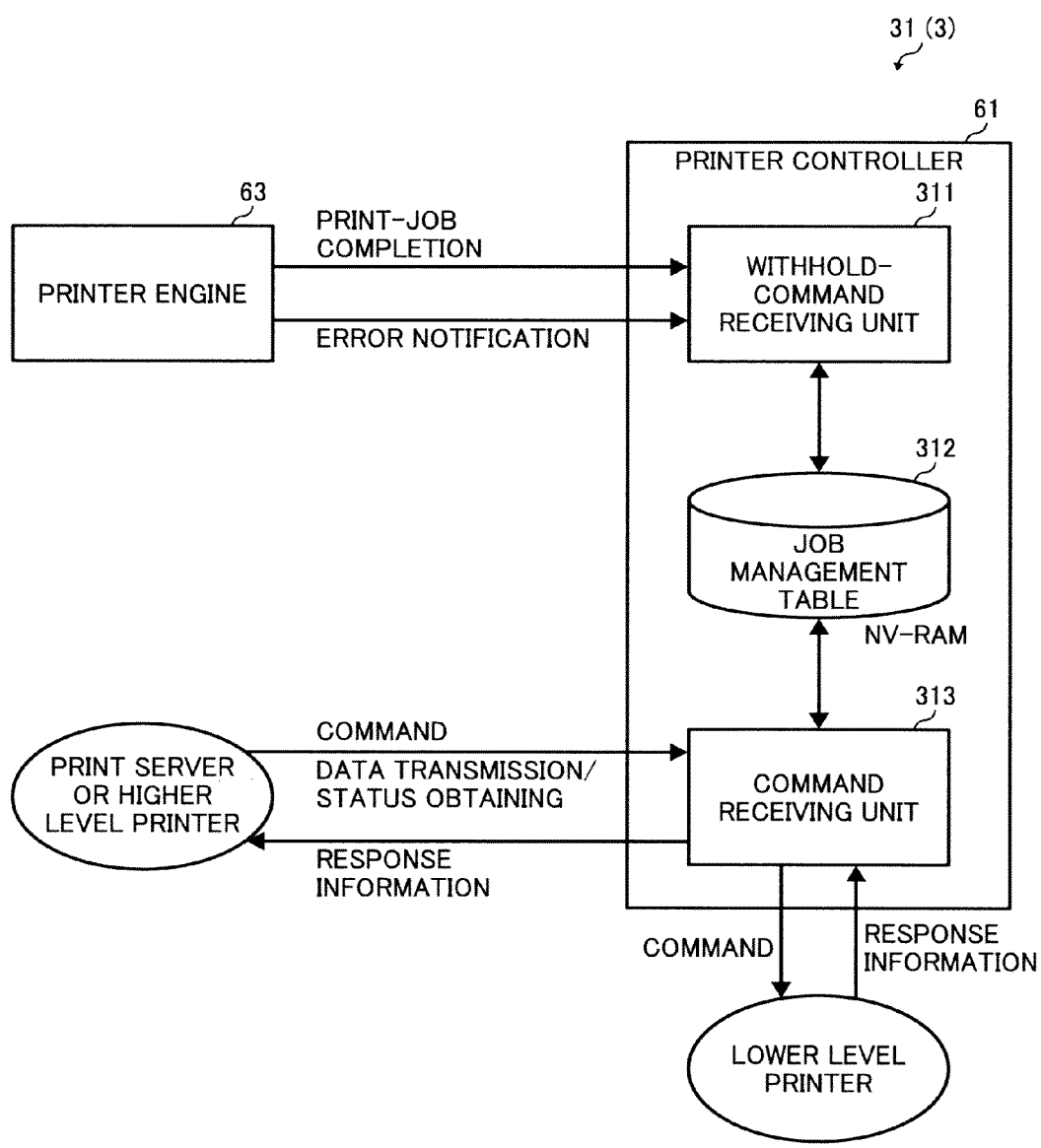
FIG. 8 is a schematic diagram for explaining a functional configuration of a job synchronization process in the substitutive printing process.

FIG. 8 is a schematic diagram for explaining a functional configuration of the job synchronization process in the substitutive printing process performed by an arbitrary one of the printers 31. As shown in FIG. 8, the printer 31 includes, as units related to the job synchronization process, a withhold-command receiving unit 311, a job management table 312 stored in the NV-RAM 84, and a command receiving unit 313.

The withhold-command receiving unit 311 receives a print-completion notice from the printer engine 63. The printer controller 61 reads the job management table 312, counts the total number of printed pages assigned to the same job ID, and stores the total number of printed pages in the job management table 312. On the other hand, upon receiving an error notice from the printer engine 63, the withhold-command receiving unit 311 stores an error code related to the error notice in the job management table 312.

The command receiving unit 313 receives a command (data transmission command or status obtaining command) from the print server 11 (server 1) or the upper-level printer 31, and transmits the received command to the lower-level printer 31. Upon receiving the response information corresponding to the status obtaining command from the lower-level printer 31, the command receiving unit 313 reads the job management table 312, and appends the page information (including the total number of printed pages) extracted from the received response information to the page information of its own. If the command receiving unit 313 receives the response information corresponding to the status obtaining command from the lower-level printer 31 and finds error code or error information in the received response information, the command receiving unit 313 appends the error information to the response information of its own. After that, the command receiving unit 313 transmits the response information acquired from the job management table 312 to the print server 11 (server 1) or the upper-level printer 31.

The printing process when no error occurs is described with reference to FIG. 9 in the following sequence:

(11) The print server 11 issues a print data transmission command to the main printer 31a. The main printer 31a forwards the print data transmission command to the first level printer 31b.

(12) Subsequently, the first level printer 31b forwards the print data transmission command to the second level printer 31c. Because no immediate lower-level printer is arranged with respect to the second level printer 31c, it sends back a response corresponding to the data transmission command (hereinafter, "print data transmission response") to the first level printer 31b and performs print data processing of the initiated print job. Eventually, the first level printer 31b sends a print data transmission response to the main printer 31a, which in turn sends a print data transmission response to the print server 11. Then, the main printer 31a performs print data processing of the initiated print job and prints the print data in the initiated print job.

(13) For each printed and discharged page of the print data, the main printer 31a issues a print data deleting command to the first level printer 31b. Consequently, the first level printer 31b deletes the print data corresponding to the discharged page. Subsequently, the first level printer 31b forwards the print data deleting command to the second level printer 31c. Consequently, the second level printer 31c also deletes the print data corresponding to the discharged page of the print data. In this way, the deleted data corresponding to the discharged pages is maintained in synchronization in the main printer 31a, the first level printer 31b, and the second level printer 31c.

(14) The print server 11 issues a status obtaining command to the main printer 31a. The main printer 31a then forwards the status obtaining command to the first level printer 31b.

(15) In turn, the first level printer 31b forwards the status obtaining command to the second level printer 31c. Because no immediate lower-level printer is arranged with respect to the second level printer 31c, it sends back a status obtaining response to the first level printer 31b, which in turn sends a status obtaining response to the main printer 31a.

Figure 11:
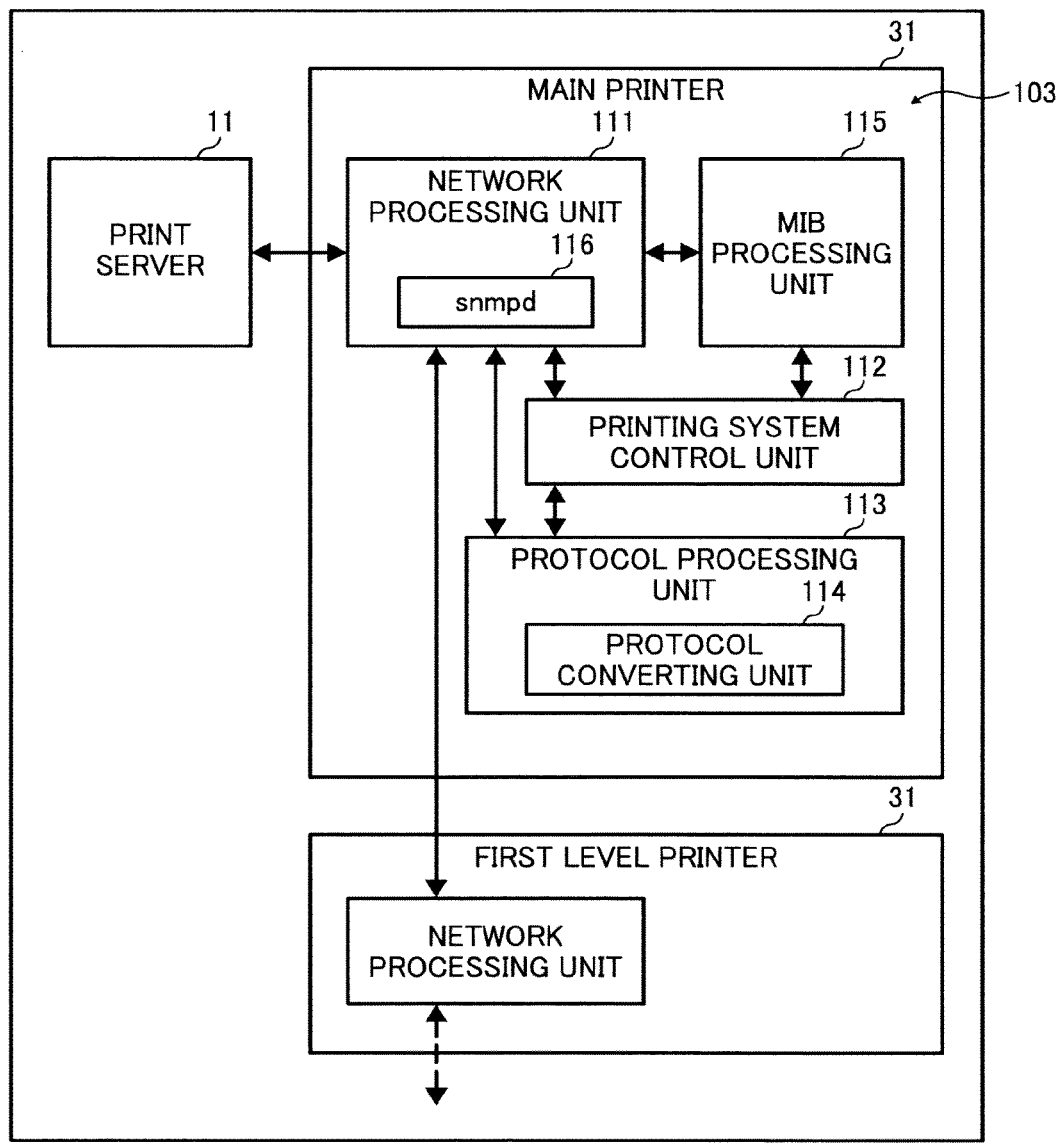
FIG. 11 is a block diagram for explaining a functional configuration of a status obtaining unit in a printer in the network printing system.

Given below is the description of a status obtaining process performed by the status obtaining unit 103 in an arbitrary one of the printers 31. As shown in FIG. 11, the status obtaining unit 103 includes a network processing unit 111, a printing system control unit 112, a protocol processing unit 113, a protocol converting unit 114, a management information base (MIB) processing unit 115 that retains MIB information, and an snmpd 116. An snmpd is a simple network management protocol (SNMP) agent that runs in a network device that is administered by using the SNMP.

MIB information, like the MIB information retained by the MIB processing unit 115, is the information released by a network device administered by using the SNMP as a notification of its own status.

The network processing unit 111 controls network reception and network transmission of print data. Upon receiving the print data, the network processing unit 111 sends it to the printing system control unit 112 for processing.

The printing system control unit 112 determines whether the received print data is control data of a predetermined protocol (other than the SNMP). If the received print data is determined to be the control data of the predetermined protocol, the printing system control unit 112 sends the print data to the protocol processing unit 113.

The protocol processing unit 113 performs processing according to the details of a control code of the predetermined protocol. More particularly, the protocol processing unit 113 functions as a determining unit to determine whether a status obtaining code of the predetermined protocol is received. If the status obtaining code of the predetermined protocol is determined to have been received, the protocol processing unit 113 sends the print data to the protocol converting unit 114. As shown in FIG. 11, the protocol converting unit 114 is arranged inside the protocol processing unit 113.

The protocol converting unit 114 functions as a converting unit to perform data conversion from the control code of the predetermined protocol into the SNMP, which functions as a status obtaining protocol commonly used in the status obtaining process, and sends the print data converted into the SNMP (status obtaining protocol) to the snmpd 116 that is loaded in the network processing unit 111.

By using the snmpd 116, it is possible to obtain the status of the self printer 31 by performing a normal status obtaining process. In the normal status obtaining process, the MIB information, which serves as status information, is obtained from the MIB processing unit 115 via the printing system control unit 112 according to the issued instruction. The obtained MIB information is set in the snmpd 116 and sent to the protocol converting unit 114.

The protocol converting unit also functions as a inverse conversion processing unit to perform inverse conversion of the MIB information into status information of the predetermined protocol.

In this way, it is possible to obtain the status information of the self printer 31.

Meanwhile, by using the same predetermined protocol, the print data received by the main printer 31 is forwarded to the corresponding immediate lower-level printer 31 for parallel protocol processing. The network processing unit 111 of the main printer 31 forwards the received print data to a corresponding lower-level printer 31. In an identical manner, the print data is sequentially forwarded until it reaches the lowest level printer 31 with respect to which no immediate lower-level printer 31 is arranged. The lowest level printer 31 sends back data in response to the reception of the print data (hereinafter, "response data") to the corresponding immediate upper-level printer 31.

Each of the upper-level printers 31 appends response data of its own to the response data of the corresponding immediate lower-level printer 31 and sends the appended response data to the corresponding immediate upper-level printer 31. Each piece of response data subjected to appending includes the status information of the self printer 31.

Figure 12B:
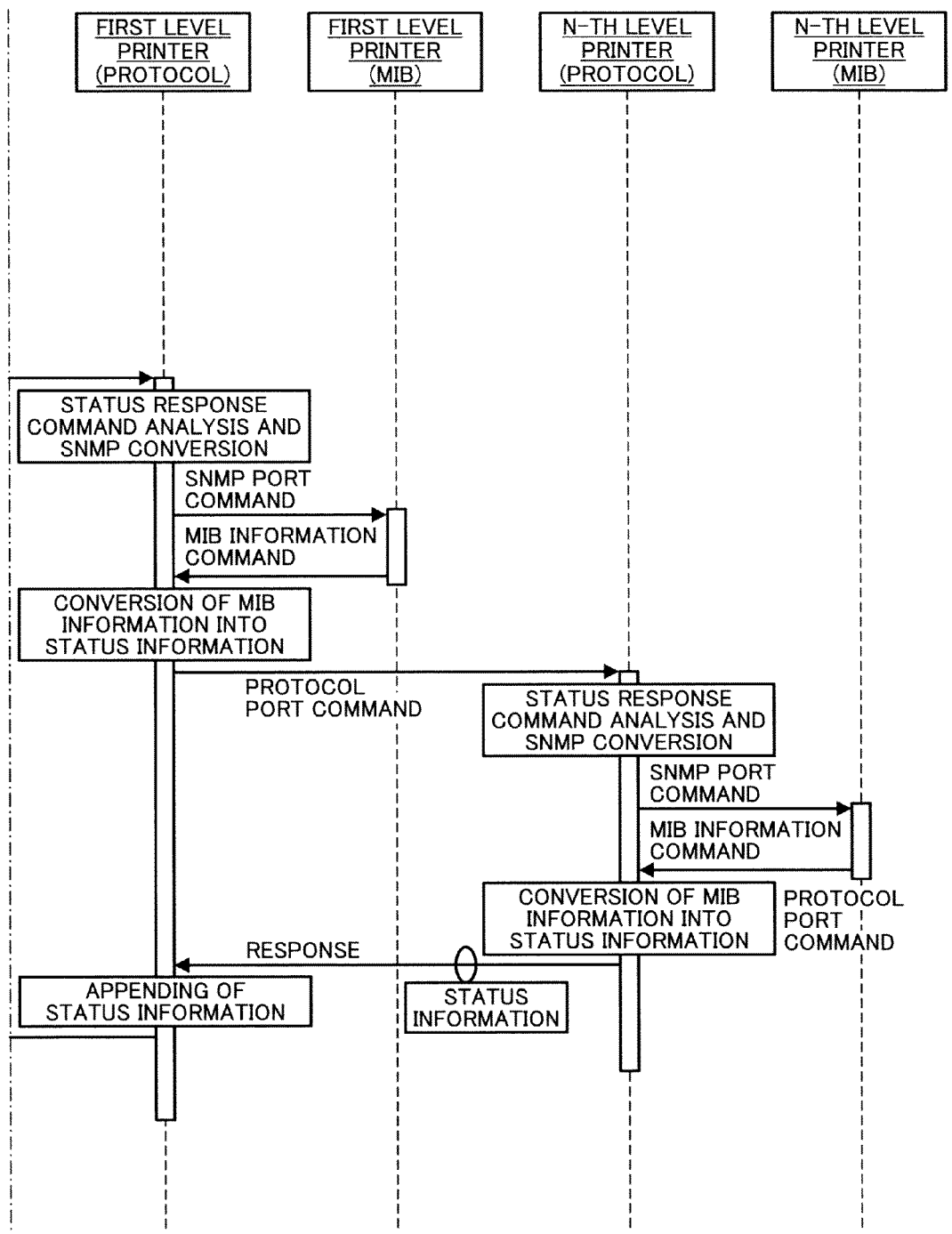
FIG. 12 is a sequence diagram for explaining the operations of the status obtaining unit.

The operations of the status obtaining unit 103 are described with reference to a sequence diagram shown in FIG. 12.

When the host apparatus (print server 11) sends print data by using a predetermined protocol, the highest level printer 31 (main printer 31) determines whether a status obtaining command is included. If a status obtaining command is determined to have been included, then, in the main printer 31, the predetermined protocol is converted into the SNMP and sent to the corresponding SNMP port. Subsequently, the MIB information is obtained from the SNMP port, converted into the status information of the predetermined protocol, and set as the response data of the predetermined protocol.

When a lower-level printer 31 is arranged with respect to the main printer 31, then the main printer 31 forwards the print data and the status obtaining command to the lower-level printer 31.

The lower-level printer 31 determines whether the status obtaining command is received. If the status obtaining command is determined to have been received, the predetermined protocol is converted into the SNMP and sent to the corresponding SNMP port. Subsequently, the MIB information is obtained from the SNMP port, converted into the status information of the predetermined protocol, and set as the response data of the predetermined protocol.

This process is repeated for a number of times equal to the number of printers 31.

In the lowest level printer 31, with respect to which no immediate lower-level printer 31 is arranged, the status information is added to the normal response data and the added response data is sent to the corresponding immediate upper-level printer 31.

The printer 31 (lower-level printer) that receives the added response data from the corresponding immediate lower-level printer 31 adds the status information of its own to the normal response data of its own to obtain added response data, appends the added response data of its own to the added response data of the corresponding immediate lower-level printer 31, and sends the appended added response data to the corresponding immediate upper-level printer 31 (main printer or lower-level printer).

Figure 13:
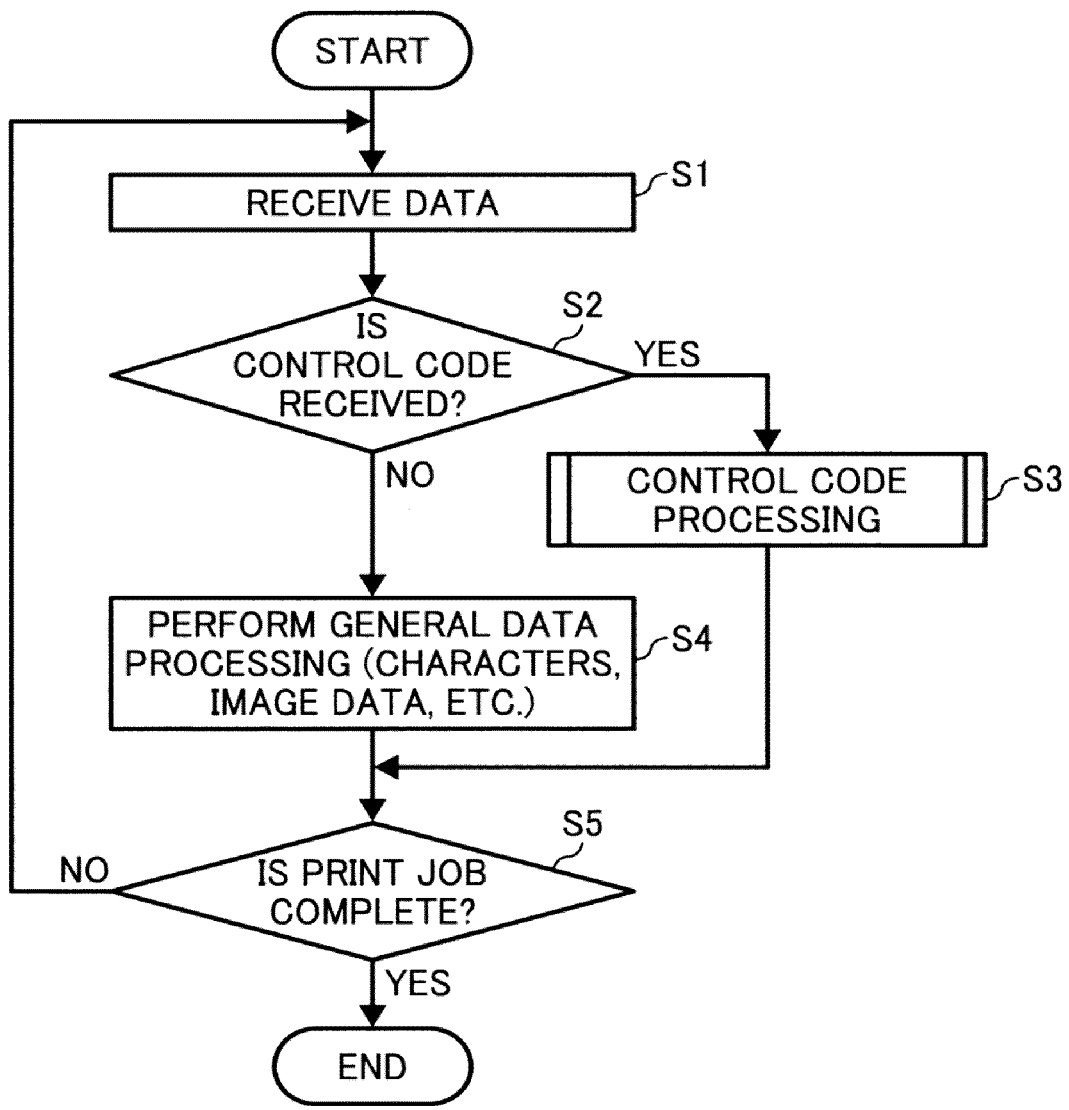
FIG. 13 is a flowchart for explaining the outline of printing a print job of a predetermined protocol.

FIG. 13 is a flowchart for explaining the outline of printing a print job of the predetermined protocol. As shown in FIG. 13, when the host apparatus (print server 11) starts sending a print job of the predetermined protocol, an arbitrary one of the printers 31 (main printer) receives print data (Step S1) and performs print data analysis (Step S2).

In the case of the control code of the predetermined protocol (Yes at Step S2), the printer 31 performs control code processing (Step S3).

Figure 14:
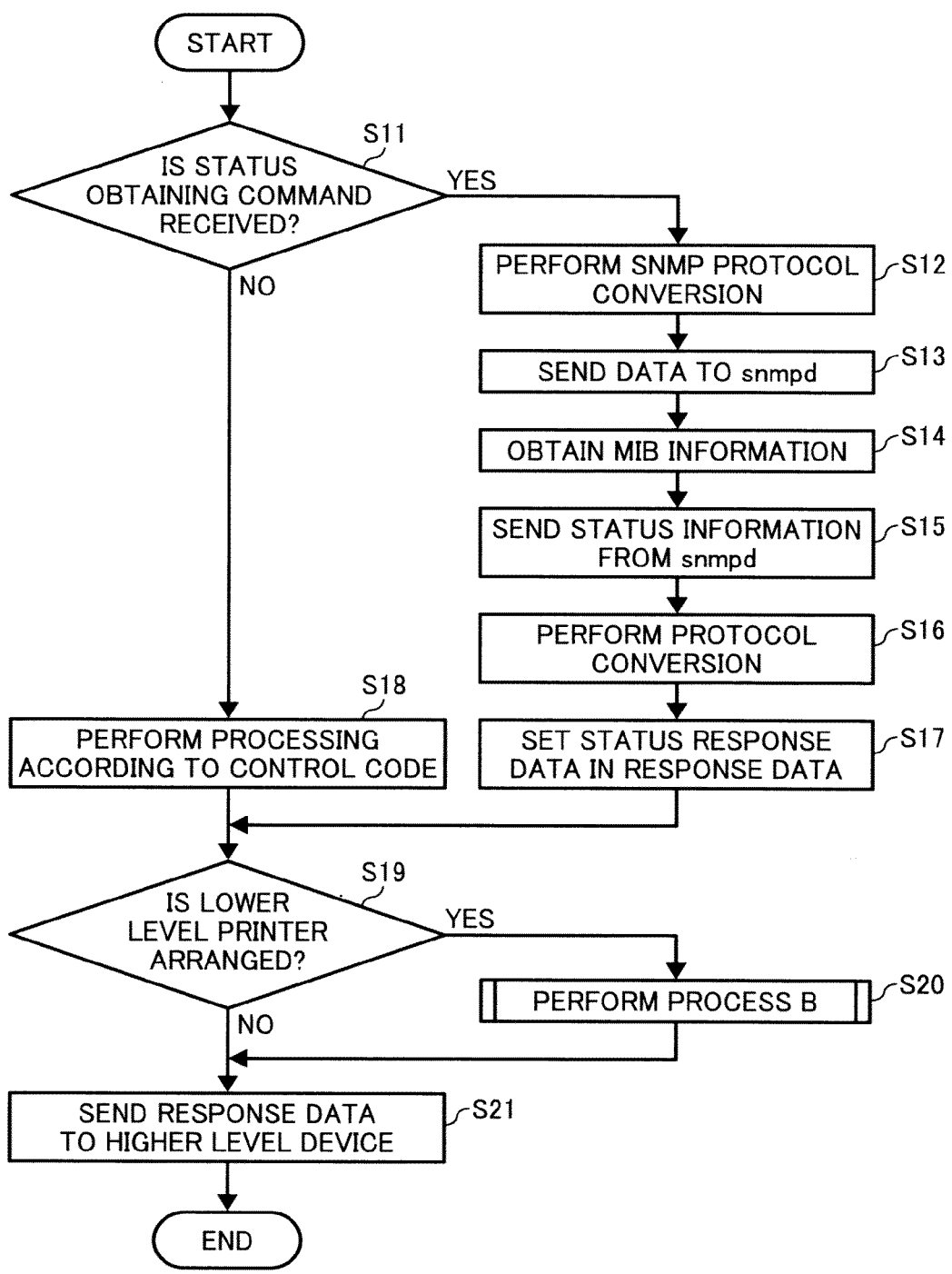
FIG. 14 is a flowchart for explaining the sequence of operations in control code processing of the control code of the predetermined protocol.

FIG. 14 is a flowchart for explaining the sequence of operations in the control code processing. As shown in FIG. 14, when the data to be processed is the control code of the predetermined protocol, it is first determined whether the control code instructs status obtaining (Step S11).

If the control code is determined to instruct status obtaining (i.e., if the control code is determined to be a status obtaining command) (Yes at Step S11), the status obtaining command is converted into the SNMP (Step S12). The SNMP has a generally determined data format and holds MIB information, which can have either one of a generally determined data format and a unique data format that is determined by a business enterprise or determined for a particular device, as a parameter. In the first embodiment, regarding the status obtaining command written in a control program of the predetermined protocol, the command format of the predetermined protocol is converted into the SNMP under the control of the protocol converting unit 114.

The SNMP data is then sent to the snmpd 116 (Step S13). Typically, SNMP data that is received via a network is sent to the snmpd 116 for processing by the network processing unit 111. In the first embodiment, the SNMP data converted at Step S12 is sent to the snmpd 116. Thus, it is possible to perform data processing in an identical manner to data processing of SNMP data received via a network.

Subsequently, the MIB information, which represents the status information, of the self printer 31 is obtained (Steps S14 and S15).

The obtained MIB information is converted into status response data that has a format that is transmittable by using the predetermined protocol (Step S16). The conversion at Step S16 is performed with respect to the status obtaining command written in the control program of the predetermined protocol under the control of the protocol converting unit 114.

The status response data in the format transmittable by using the predetermined protocol is set in the response data (Step S17).

Reverting to Step S11, if the control code is not determined to be a status obtaining command (No at Step S11), general processing of the control code of the predetermined protocol is performed (Step S18).

When a lower-level printer 31 is arranged (Yes at Step S19), the system control proceeds to Step S20.

Figure 15:
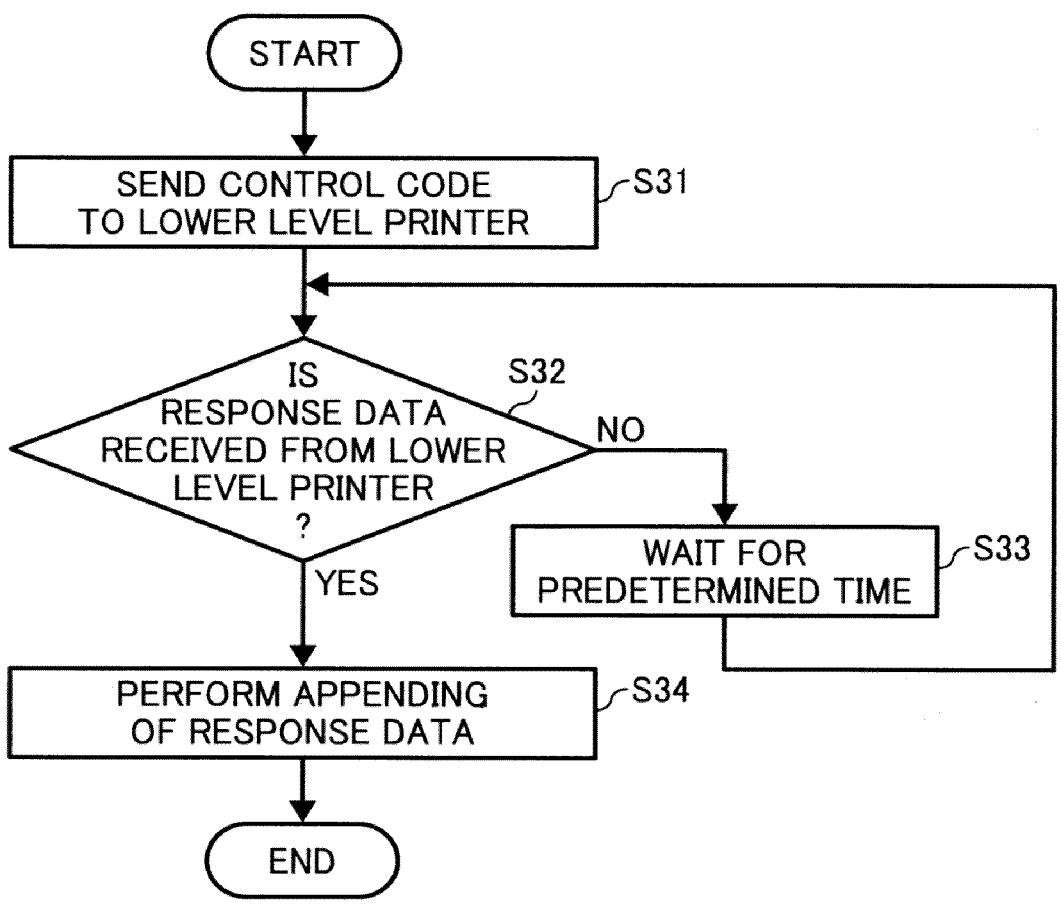
FIG. 15 is a flowchart for explaining the operations performed at Step S20 shown in FIG. 14.

The processing at Step S20 is described with reference to the flowchart in FIG. 15. As shown in FIG. 15, the print data received by the self printer 31 is forwarded to the corresponding immediate lower-level printer 31 (Step S31). In the case of receiving control code including response data, Steps S32 and S33 are repeated while the self printer 31 waits for response data from the corresponding immediate lower-level printer 31.

When the response data is determined to have been received from the corresponding immediate lower-level printer 31 (Yes at Step S32), the self printer 31 appends response data of its own to the received response data and sends the appended response data to the corresponding immediate upper-level printer 31 (Step S34). That completes the processing at Step S20 in FIG. 14. Meanwhile, each piece of response data subjected to appending includes the status information of the self printer 31.

Reverting to FIG. 14, upon completion of the processing at Step S20, or, when a lower-level printer 31 is not arranged with respect to the self printer 31 (No at Step S19), the appended response data is sent to the corresponding immediate upper-level device (printer 31 or print server 11) (Step S21). That completes the processing at Step S3 in FIG. 13.

In FIG. 13, in case the control code is not of the predetermined protocol (No at Step S2), processing is performed identical to processing of general data (Step S4). Herein, general data refers to a control code other than the control code of the predetermined protocol or a character code.

The processing from Step S1 to Step S4 is repeated if the print job is not determined to have been completed (No at Step S5).

The print job is completed when determined so at Step S5 (Yes at Step S5).

Figure 10:
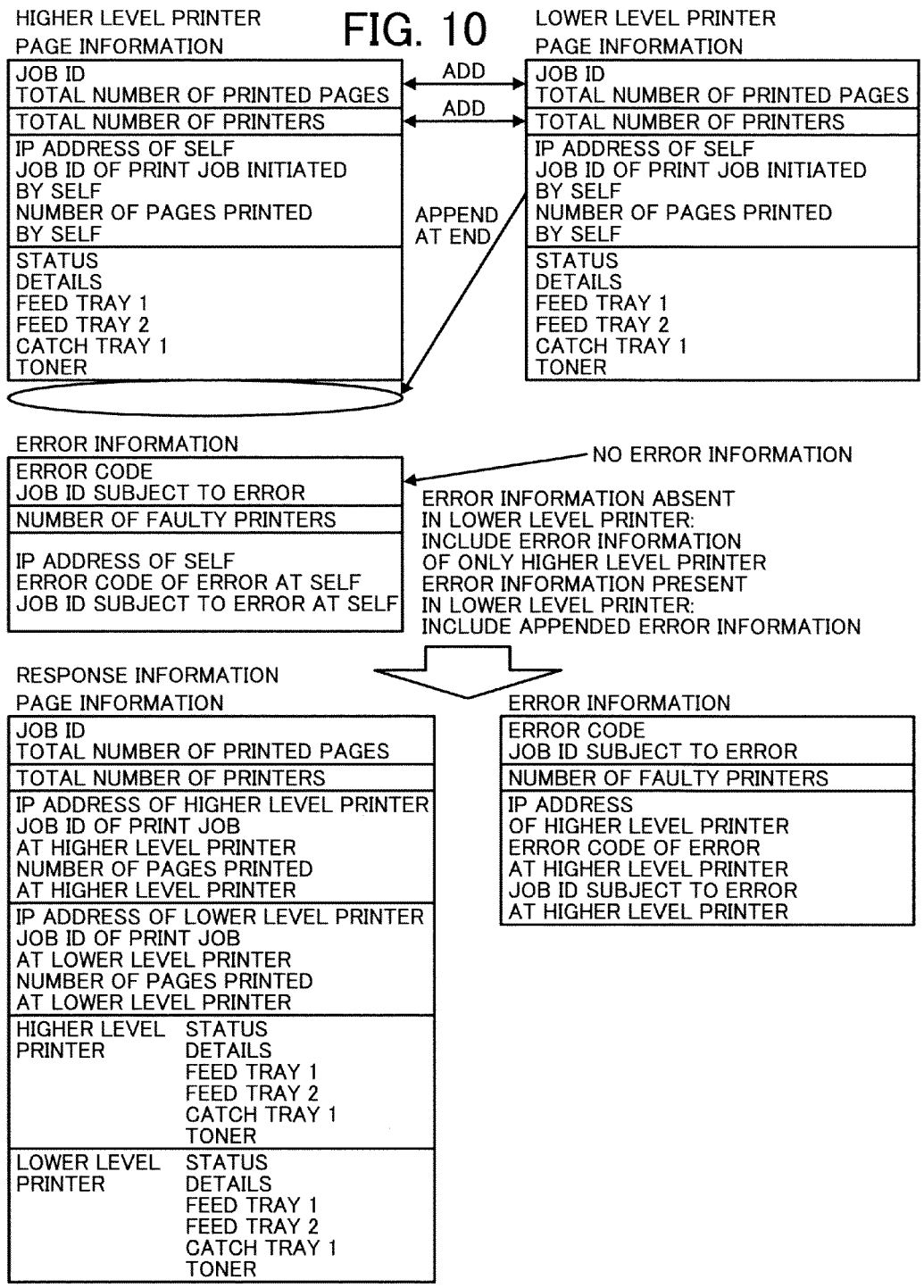
FIG. 10 is a diagram for explaining exemplary appending of response information.

As shown in FIG. 10, an upper-level printer, which can be a main printer, appends page information of a corresponding lower-level printer to page information of its own to generate appended page information. The page information of each printer includes the total number of printed pages for the initiated print job, the total number of printers, and the printer information (e.g., IP address, job ID of initiated print job, number of printed pages) of each printer. An upper-level printer, first, receives the page information from the corresponding immediate lower-level printer. Then, the upper-level printer appends the received page information to the page information of its own, and sends the appended page information to the corresponding immediate upper-level printer.

In the first embodiment, the response data includes information regarding the first printed page, the last printed page, and the job ID of the print job completed by the self printer 31 as well as information regarding the status of the self printer 31 at the time of sending back the response data. For example, the response data includes items such as "status", "details", "feed tray 2", "feed tray 1", "catch tray 1" and "toner".

The item "status" includes the information about the status of the self printer 31. The status of the self printer 31 can be a printable status (no problem for printing), a cautioning status (a problem has occurred but printing is possible), or an error status (a problem has occurred due to which printing is not possible).

The item "details" includes the details of the problems in the cautioning status or in the error status. The exemplary problems in the cautioning status include a toner-near-end condition, a paper-near-end condition, a side-covers-open condition, and a stapler empty condition. The exemplary problems in the error status include a toner empty condition, a paper-out condition, a front-cover-open condition, a discharge jam condition, and a feed jam condition.

The items "feed tray 2" and "feed tray 1" include the details about the paper size and the remaining number of paper sheets set in the corresponding feed trays.

The item "catch tray 1" includes information regarding problems such as a tray full condition.

The item "toner" includes information regarding problems such as a toner-near-end condition and a toner empty condition and indicates the amount of residual toner (%) according to the specifications of the self printer 31.

Meanwhile, along with the page information, the upper-level printer appends error information of the corresponding lower-level printer to error information of its own to generate appended error information. The error information of each printer includes an error code for the interrupted print job, the number of printers in which the print job was interrupted due to an error, and its own printer information. In the example shown in FIG. 10, error information is not generated in the lower-level printer because no error occurs therein.

Figure 9:
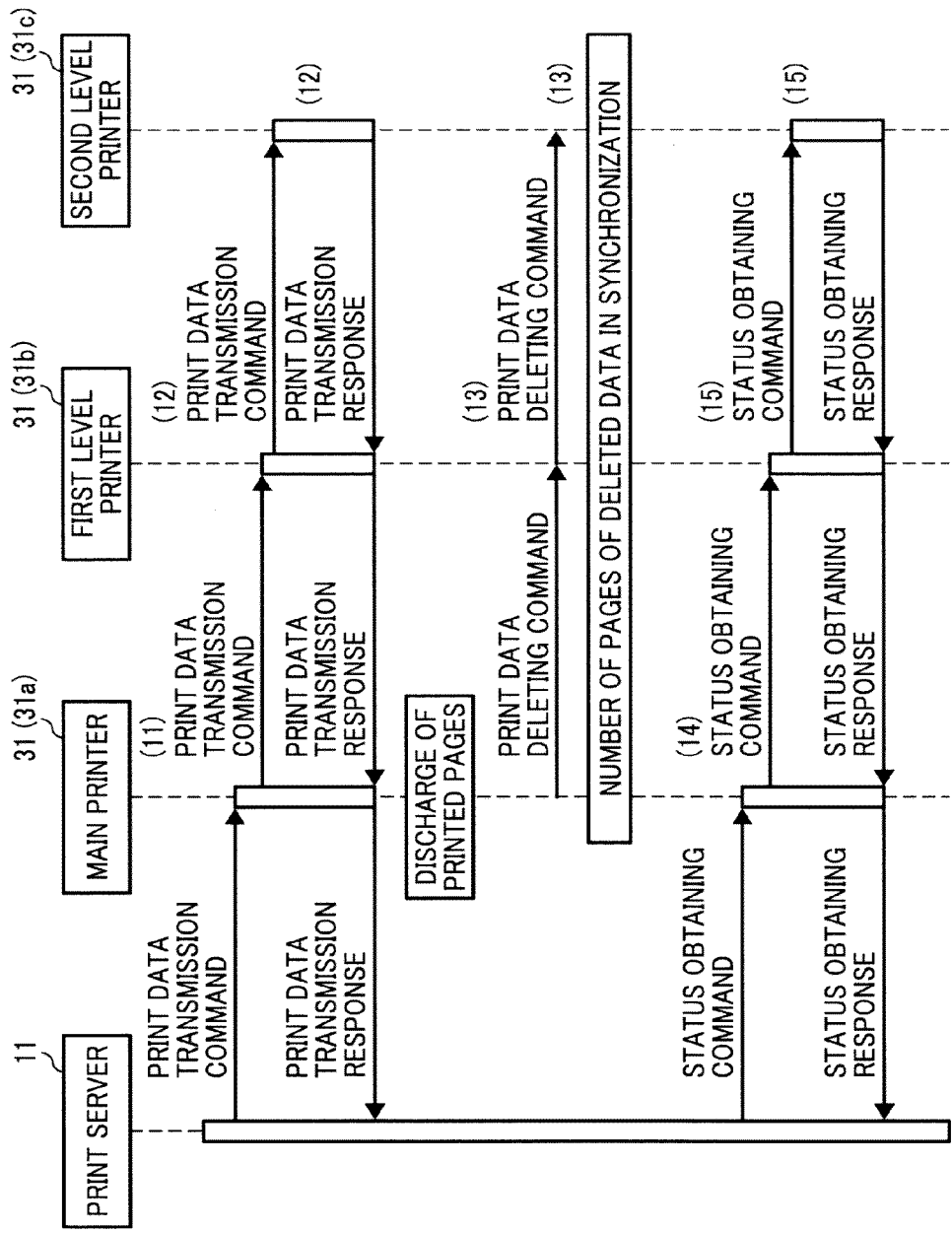
FIG. 9 is a sequence diagram of an exemplary printing process when no error occurs in a main printer.

As shown in FIG. 9, upon generating the appended page information and the appended error information, the main printer 31a sends a status obtaining response to the print server 11. The status obtaining response includes the appended page information and the appended error information. Subsequently, the printing process is completed unless an error occurs in the main printer 31a.

Because of the status obtaining response, the print server 11 is able to obtain the information regarding the total number of printed pages of the initiated print job and the print status of each of the main printer 31a, the first level printer 31b, and the second level printer 31c. The print server 11 keeps a log of the information obtained from the status obtaining response. Meanwhile, in the example shown in FIG. 9, the print data is printed in entirety by the main printer 31a. Thus, the total number of printed pages notified to the print server 11 is equal to the number of pages printed by the main printer 31a.

Figure 16:
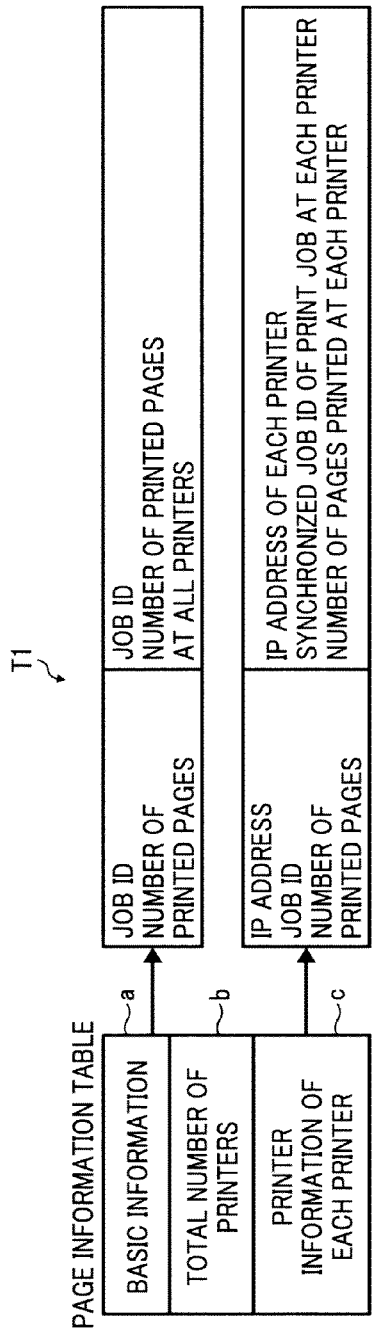
FIG. 16 is a diagram for explaining an exemplary page information table maintained in the printer server.

FIG. 16 is a diagram for explaining an exemplary page information table T1 maintained in the RAM 43 of the print server 11. The page information table T1 is used to store the appended page information obtained from the status obtaining response of the main printer 31a. The page information table T1 includes three portions, namely, a, b, and c. In the portion a, basic information such as the job ID of each initiated print job and the number of printed pages for the initiated print job is stored. In the portion b, the total number of printers that sent the response information is stored. In the portion c, the printer information of each printer (e.g., the IP address, job ID of initiated print job, number of printed pages) is stored. Meanwhile, as described above, the job ID of the print job initiated by each printer is identical.

Figure 17:
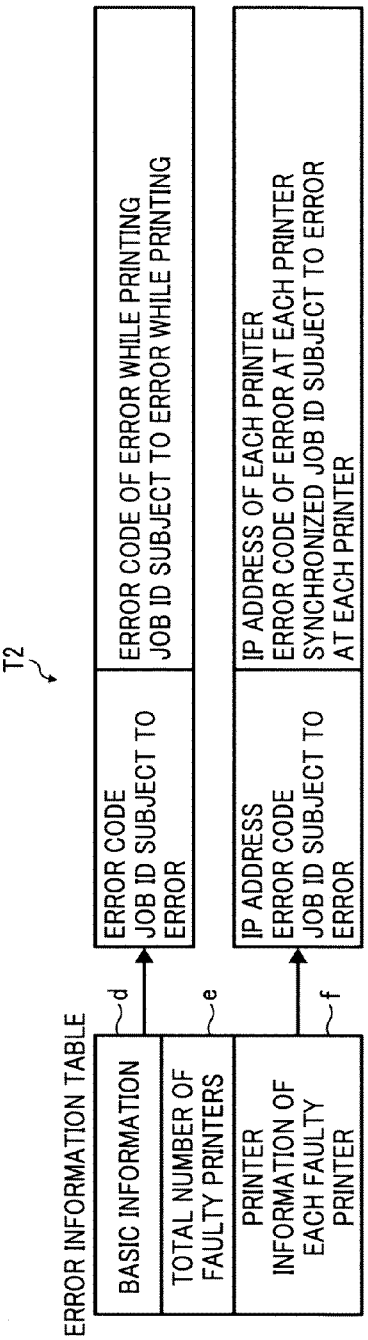
FIG. 17 is a diagram for explaining an exemplary error information table maintained in the printer server.

FIG. 17 is a diagram for explaining an exemplary error information table T2 maintained in the RAM 43 of the print server 11. The error information table T2 is used to store the appended error information obtained from the status obtaining response of the main printer 31a. The error information table T2 includes three portions, namely, d, e, and f. In the portion d, information such as the error code for each interrupted print job and the printers at which the print job was interrupted is stored. In the portion e, the number of printers at which the print job was interrupted is stored. In the portion f, the printer information each printer (e.g., IP address, job ID of the interrupted print job, and number of printed pages for the interrupted print job) at which the print job was interrupted is stored. Meanwhile, as described above, the job ID of the print job interrupted in any of the printers is identical.

Figure 18:
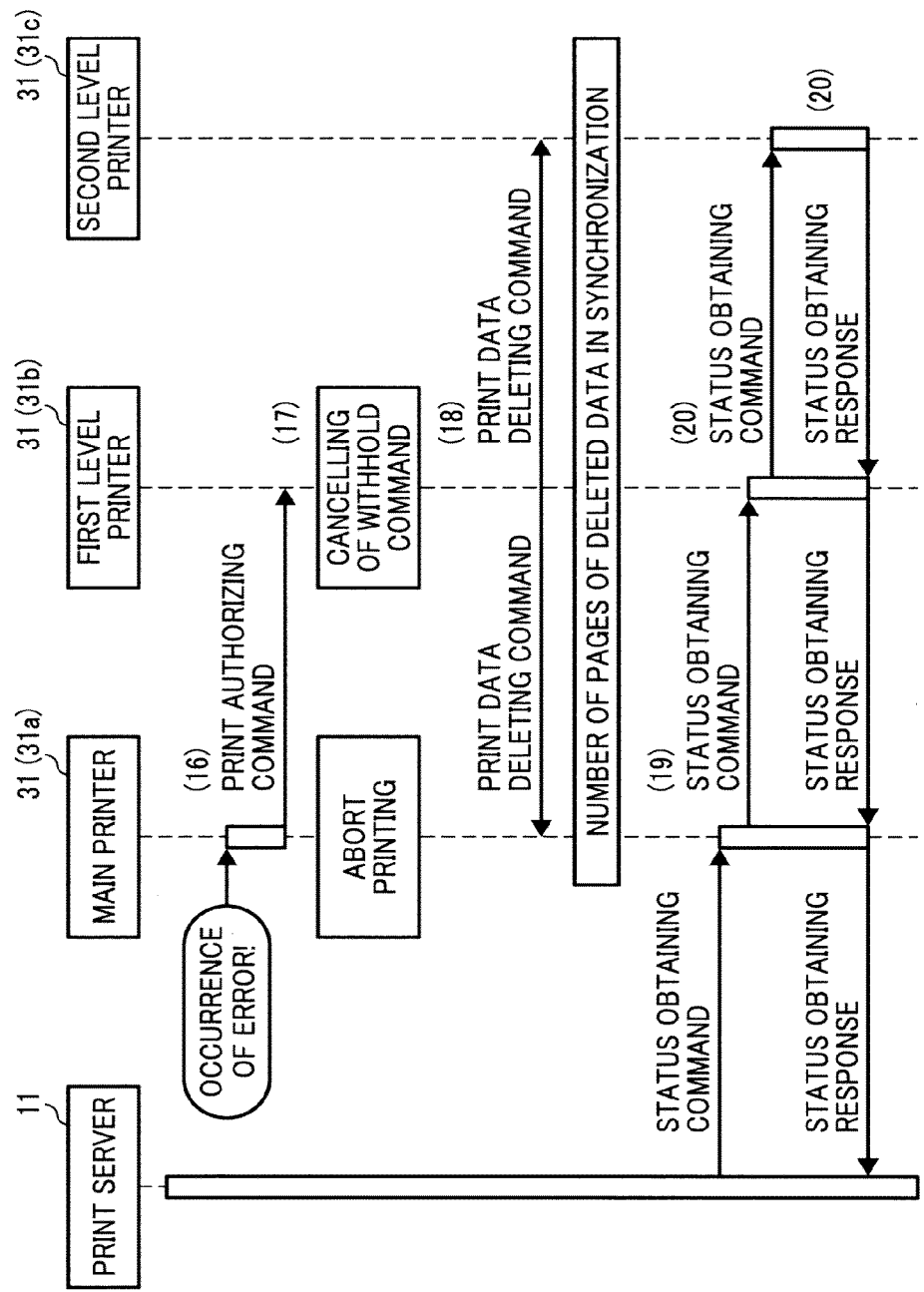
FIG. 18 is a sequence diagram of an exemplary substitutive printing process when an error occurs in the main printer while printing the print data.

FIG. 18 is a sequence diagram of an exemplary substitutive printing process when an error occurs in the main printer 31a while printing the print data. The substitutive printing process can be performed when a plurality of printers is connected via a LAN by using a linear topology, a star topology, a ring topology, and the like. In such a configuration, it is possible to substitutively perform printing of print data in a substitute printer in case a problem occurs in the current printer while printing that print data.

The substitutive printing process described with reference to FIG. 18 is performed in the following sequence:

(16) If an error (e.g., paper-out condition) occurs in the main printer 31a while printing the print data, the main printer 31a issues a print authorizing command to the first level printer 31b. The main printer 31a then aborts printing of the print data and withholds printing thereafter.

(17) Upon receiving the print authorizing command from the main printer 31a, the first level printer 31b cancels the withhold command that it had received earlier from the main printer 31a. As a result, the first level printer 31b can substitutively start to print the print data in place of the main printer 31a.

(18) For each printed and discharged page of the print job, the first level printer 31b issues a print data deleting command to each of the main printer 31a and the second level printer 31c. Consequently, each of the main printer 31a and the second level printer 31c deletes the print data corresponding to the discharged page.

(19) The print server 11 issues the status obtaining command to the main printer 31a. The main printer 31a then forwards the status obtaining command to the first level printer 31b.

(20) In turn, the first level printer 31b forwards the status obtaining command to the second level printer 31c. Because no immediate lower-level printer is arranged with respect to the second level printer 31c, it sends back a status obtaining response to the first level printer 31b, which in turn sends a status obtaining response to the main printer 31a. Eventually, the main printer 31a sends a status obtaining response to the print server 11. The status obtaining response includes the page information and the error information of each of the main printer 31a, the first level printer 31b, and the second level printer 31c. As a result, the print server 11 is able to obtain the information regarding the total number of printed pages and the print status of each of the main printer 31a, the first level printer 31b, and the second level printer 31c. The print server 11 keeps a log of the information obtained from the status obtaining response of the main printer 31a. Meanwhile, in the example shown in FIG. 14, the print data is printed first by the main printer 31a and then by the first level printer 31b. Thus, the total number of printed pages notified to the print server 11 is equal to the sum of the number of pages printed by the main printer 31a and the number of pages printed by the first level printer 31b.

Figure 19:
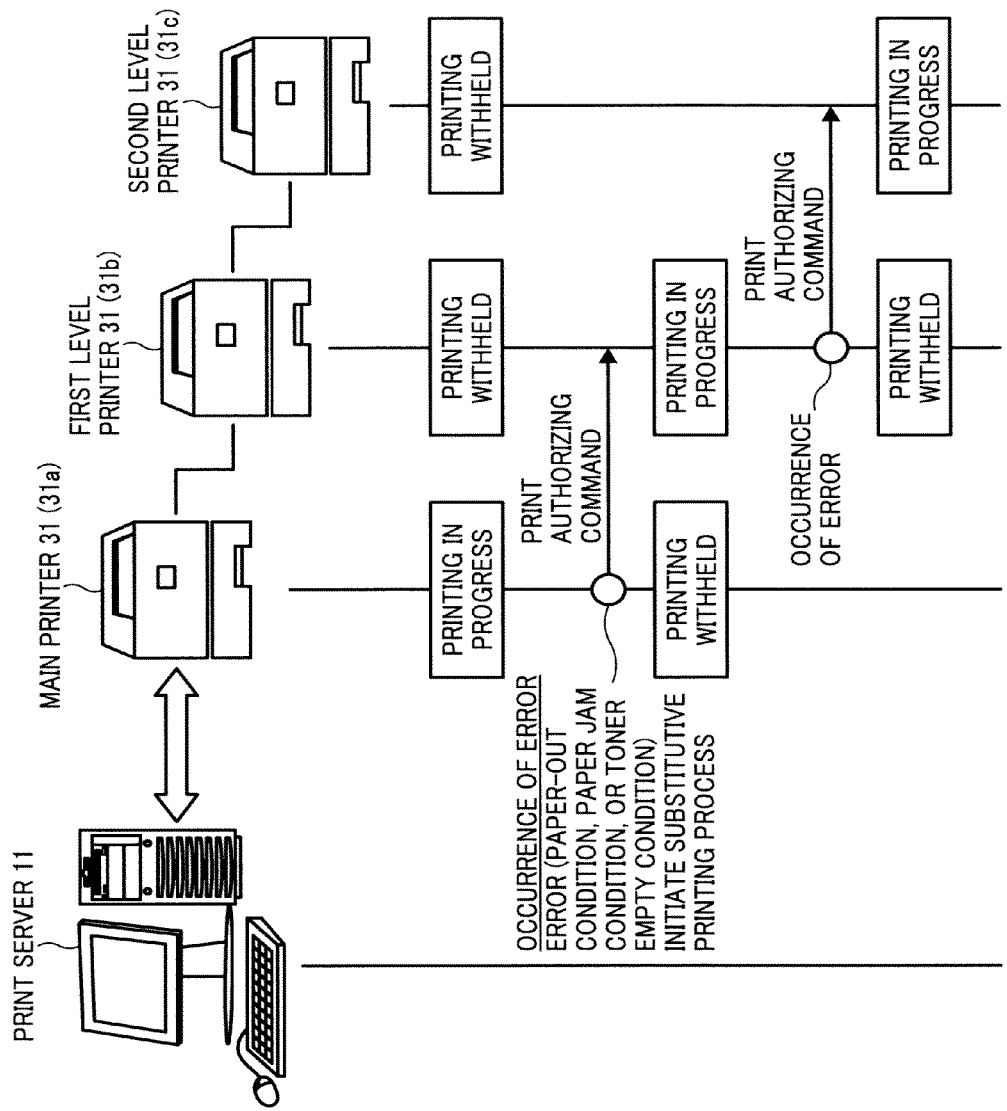
FIG. 19 is a sequence diagram of an exemplary substitutive printing process when an error occurs in more than one printer while printing print data.

In this way, even if an error occurs in the main printer 31a while printing the print data, the error information is not immediately notified to the print server 11. Instead, the first level printer 31b is instructed to substitutively continue the printing process. Similarly, even if an error occurs in the first level printer 31b while printing the print data, the second level printer 31c is instructed to substitutively continue the printing without immediately notifying the error information to the print server 11 (see FIG. 19).

When an error occurs only in the main printer 31a, the appended error information notified to the print server 11 includes the error information only of the main printer 31a. If the first level printer 31b successfully prints the remaining print data, then no error information is generated therein.

Figure 20B:
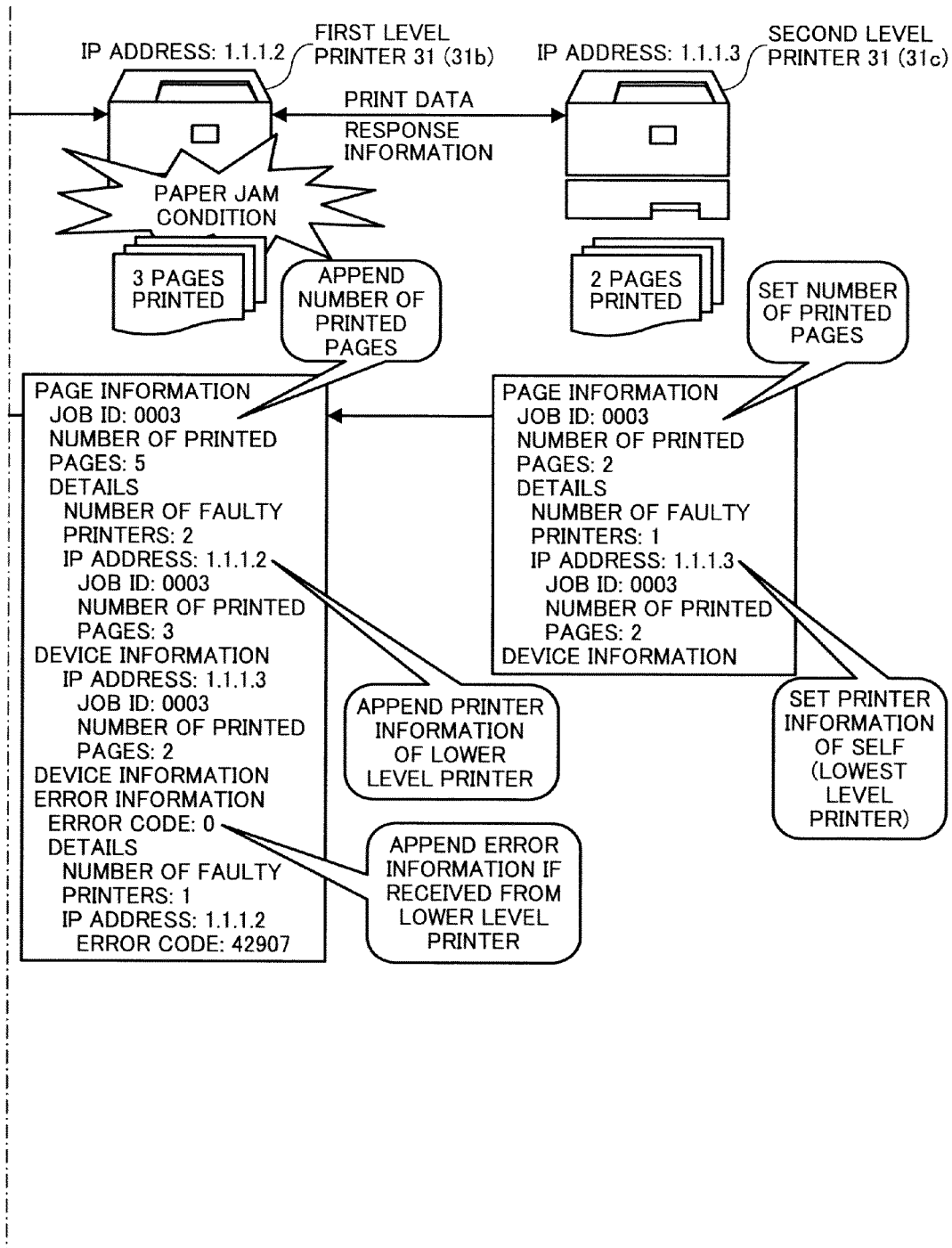
FIG. 20 is a diagram for explaining an exemplary substitutive printing process when an error occurs in more than one printer while printing print data.

FIG. 20 is a diagram for explaining an exemplary substitutive printing process when an error occurs in each of the main printer 31a and the first level printer 31b while printing the print data. In the example shown in FIG. 20, it is assumed that the print server 11 instructs the main printer 31a to print 10 pages of print data. It is assumed that the main printer 31a prints the first five pages and an error occurs in the main printer 31a. Moreover, it is assumed that the first level printer 31b prints the subsequent three pages and an error occurs in the first level printer 31b. Finally, it is assumed that the second level printer 31c successfully prints the last two pages such that the printing process is complete. In this case, the appended error information notified to the print server 11 includes the error information of the main printer 31a and the first level printer 31b.

When the print server 11 receives the status obtaining response from the main printer 31a, it is able to obtain the information regarding the number of printed pages at each of the main printer 31a, the first level printer 31b, and the second level printer 31c as well as the error information of the main printer 31a and the first level printer 31b.

Upon completion of each printing process, the print server 11 releases the main printer 31a, the first level printer 31b, and the second level printer 31c from the dedicated status in the following sequence with reference to FIG. 6:

(5) First, the print server 11 issues a print-job close command to the main printer 31a. Consequently, the main printer 31a closes the initiated print job and forwards the print-job close command to the first level printer 31b.

(6) Subsequently, the first level printer 31b closes the initiated print job and forwards the print-job close command to the second level printer 31c. Because no immediate lower-level printer is arranged with respect to the second level printer 31c, it sends back a response corresponding to the print-job close command (hereinafter, "print-job close response") to the first level printer 31b, which in turn sends a print-job close response to the main printer 31a. Eventually, the main printer 31a sends a print-job close response to the print server 11 indicating that each of the main printer 31a, the first level printer 31b, and the second level printer 31c has closed the initiated print job.

(7) The print server 11 then issues a printer release command to the main printer 31a such that the main printer 31a is released from the dedicated status with respect to the print server 11. The main printer 31a then forwards the printer release command to the first level printer 31b.

(8) Consequently, the first level printer 31b is released from the dedicated status with respect to the print server 11. The first level printer 31b then forwards the printer release command to the second level printer 31c. Because no immediate lower-level printer is arranged with respect to the second level printer 31c, it sends back a response corresponding to the printer release command (hereinafter, "printer release response") to the first level printer 31b, which in turn sends a printer release response to the main printer 31a. Eventually, the main printer 31a sends a printer release response to the print server 11 indicating that each of the main printer 31a, the first level printer 31b, and the second level printer 31c is released from the dedicated status with respect to the print server 11.

In this manner, the job synchronizing unit 102 maintains the synchronization between the print job stored in the self printer 31 and the print job stored in the other printers 31 in session with the self printer 31.

Figure 21:
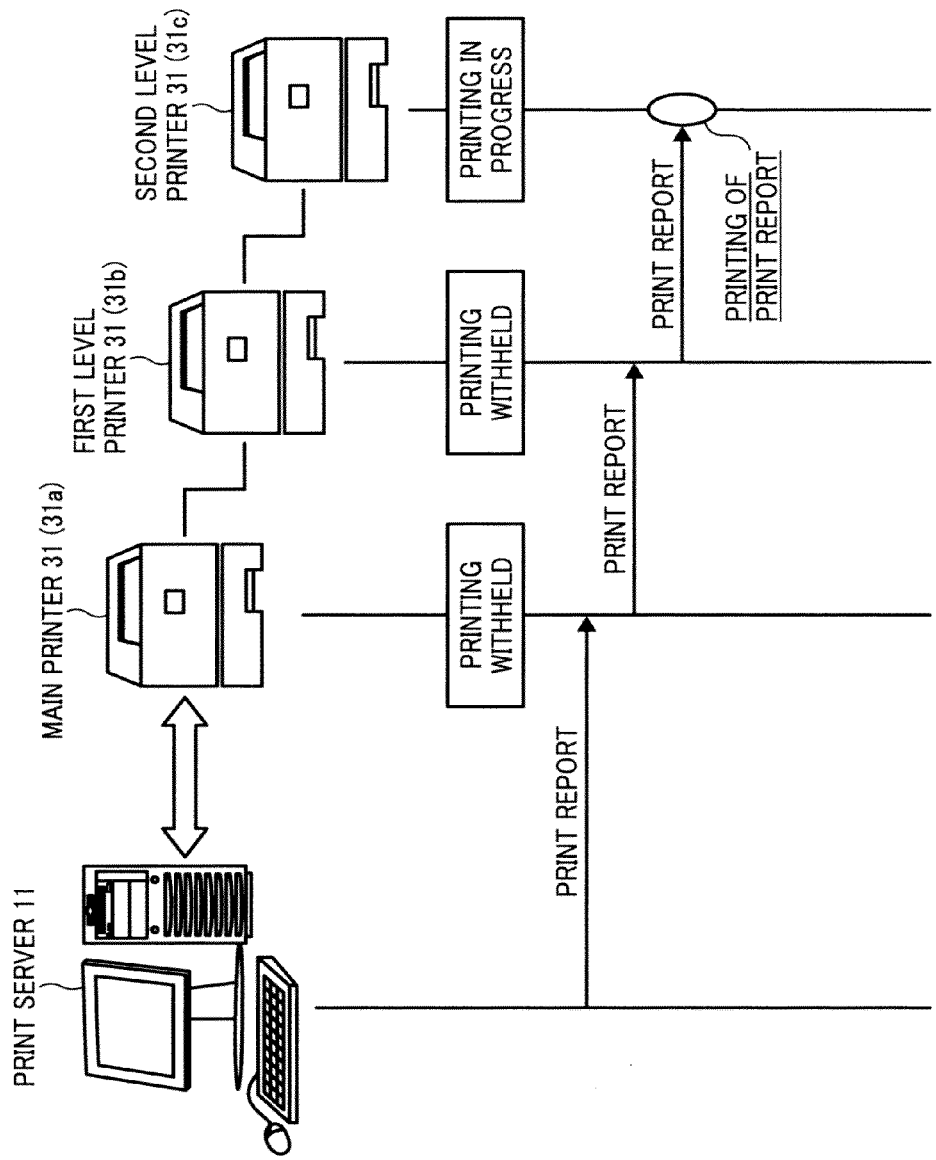
FIG. 21 is a sequence diagram of an exemplary print report generating process performed after completion of the substitutive printing process.

FIG. 21 is a sequence diagram of an exemplary print report generating process performed after completion of the substitutive printing process described with reference to FIG. 20. The print server 11 generates a print report based on the page information table T1 and the error information table T2. Subsequently, the print server 11 sends the print report to the main printer 31a. For these processes, a report generating functionality and a report sending functionality is used.

The print report is then sequentially forwarded to the first level printer 31b and the second level printer 31c. The second level printer 31c is instructed, as the last printer to perform substitutive printing, to print the print report.

FIG. 22 is a diagram of an exemplary print report generated during the print report generating process. The print report includes the job ID of the initiated print job, a document name of the initiated print job, and the total number of printed pages of the initiated print job. The print report also includes the printer information of each of the main printer 31a, the first level printer 31b, and the second level printer 31c. The printer information of each printer includes the IP address, the page number of the first printed page, the page number of the last printed page, the total number of pages printed, and error information. By circulating the print report to each of the main printer 31a, the first level printer 31b, and the second level printer 31c, it becomes possible to crosscheck whether the substitutive printing process is performed properly. Moreover, by instructing the second level printer 31c to print the print report, it becomes possible for the user to confirm the number of pages printed at each of the main printer 31a, the first level printer 31b, and the second level printer 31c. Furthermore, the print report enables the user to make sure that no printed page is left uncollected and that there is no mix-up while collecting printed pages of different documents.

In this way, according to the first embodiment, even if an error (e.g., a paper-out condition, a paper jam condition, or a toner empty condition) that typically requires user intervention for resolution occurs in an upper-level printer while printing the print data, a lower-level printer performs printing of the print data in place of the upper-level printer. Hence, the print data is printed out without fail thereby enhancing the reliability of the printing system. Moreover, because it is possible to obtain the status information of each printer in session, a printing job can be initiated after taking action (e.g., setting more paper sheets or filling toner) against potential errors that are predictable from the status information. That enhances the reliability of the printing system.

In other words, because of the substitutive printing process, the print data is successfully printed irrespective of an error in one or more printers in the network printing system. That enhances the reliability of the network printing system.

Meanwhile, printer information (e.g., print destination and number of printed pages) of a lower-level printer is appended to printer information of a corresponding immediate upper-level printer. Such appended printer information of all the printers is sent to the host apparatus. As a result, the host apparatus is able to accurately obtain the information regarding the total number of printed pages and the status of each printer in the network printing system.

Moreover, based on the printer information, the host apparatus generates a print report. The print report is circulated to each printer such that it is possible to crosscheck whether the substitutive printing process is performed properly. Furthermore, a lower-level printer that performs the substitutive printing at the last is instructed to print the print report. That enables a user to confirm the number of pages printed at each printer.

Furthermore, because a plurality of printers is connected to perform a substitutive printing process, it becomes possible to reliably print the print data even if an error occurs in one or more printers. As a result, the print data is successfully printed without interruption thereby reducing the man-hours that are consumed in system recovery in case of an interruption.

Furthermore, lower-cost printers can be provided by using an application shared by the main printer and the lower-level printers.

Given below is the description with reference to FIGS. 23 and 24 of the network printing system 100 according to a second embodiment of the present invention. The identical configuration of the network printing system 100 to that described in the first embodiment is referred to by the same reference numerals and the description is not repeated for clarity.

According to the first embodiment, the status information of each of the printers 31 is obtained. In contrast, according to the second embodiment, a target printer 31 from among the printers 31 is identified for obtaining the status information.

Figure 23B:
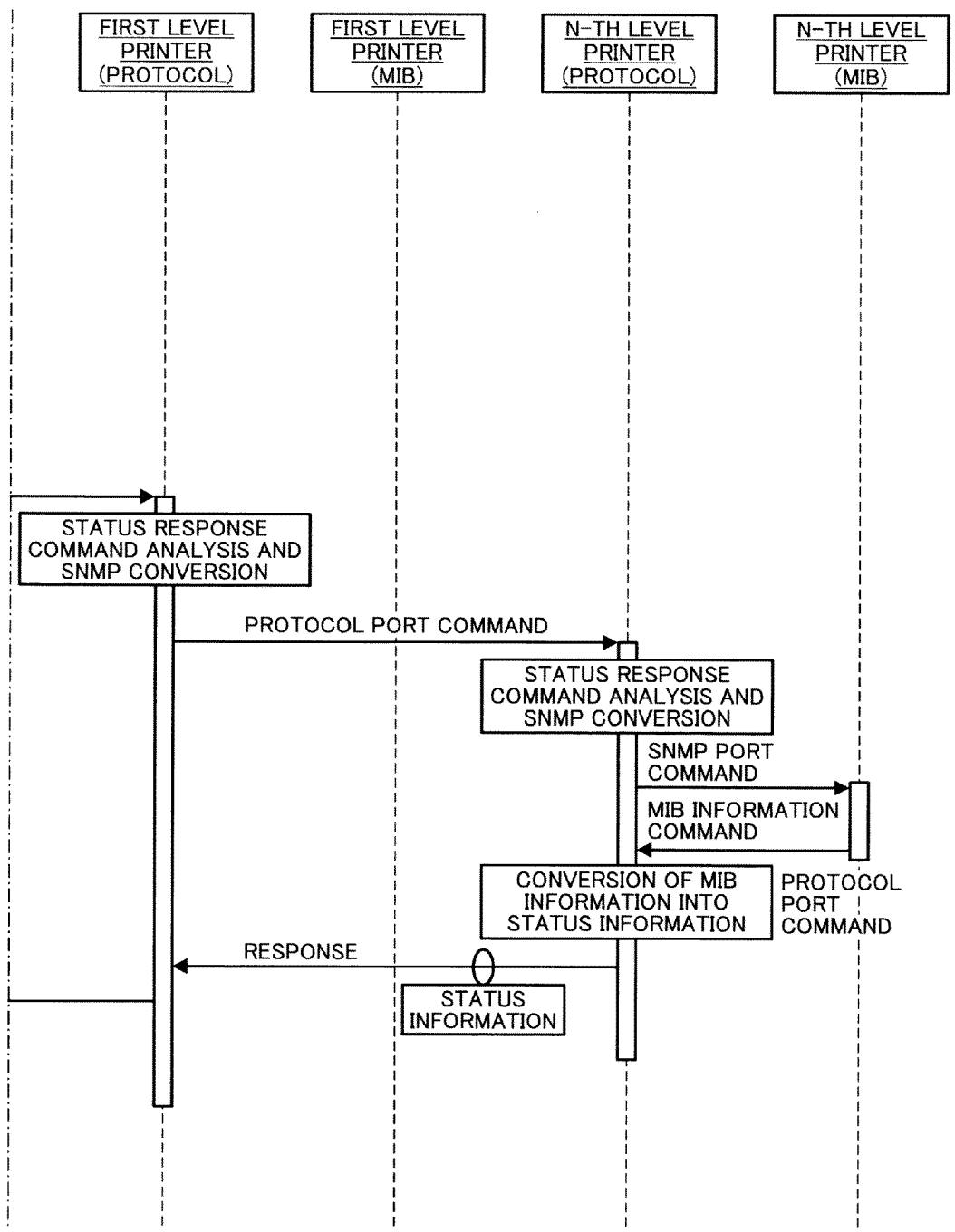
FIG. 23 is a sequence diagram of exemplary operations performed by a status obtaining unit according to a second embodiment of the present invention.

FIG. 23 is a sequence diagram of exemplary operations performed by the status obtaining unit 103 according to the second embodiment. As shown in FIG. 23, the sequence of operations in receiving the print data from the higher device (print server or upper-level printer) and checking for the status obtaining command is identical to the sequence of operations described with reference to FIG. 12. However, according to the second embodiment, the print data sent by the host apparatus (print server 11) includes a printer identifying command in addition to the status obtaining command. Accordingly, if the self printer 31 is determined to be the printer identified by the printer identifying command, the status information of the self printer 31 is obtained. On the other hand, if the self printer 31 is not determined to be the printer identified by the printer identifying command, the status information of the self printer 31 is not obtained. In the example shown in FIG. 23, the main printer is determined to be the printer identified by the printer identifying command and the status information of the main printer is obtained. However, because the first level printer is not determined to be the printer identified by the printer identifying command, the status information of the first level printer is not obtained.

Figure 24:
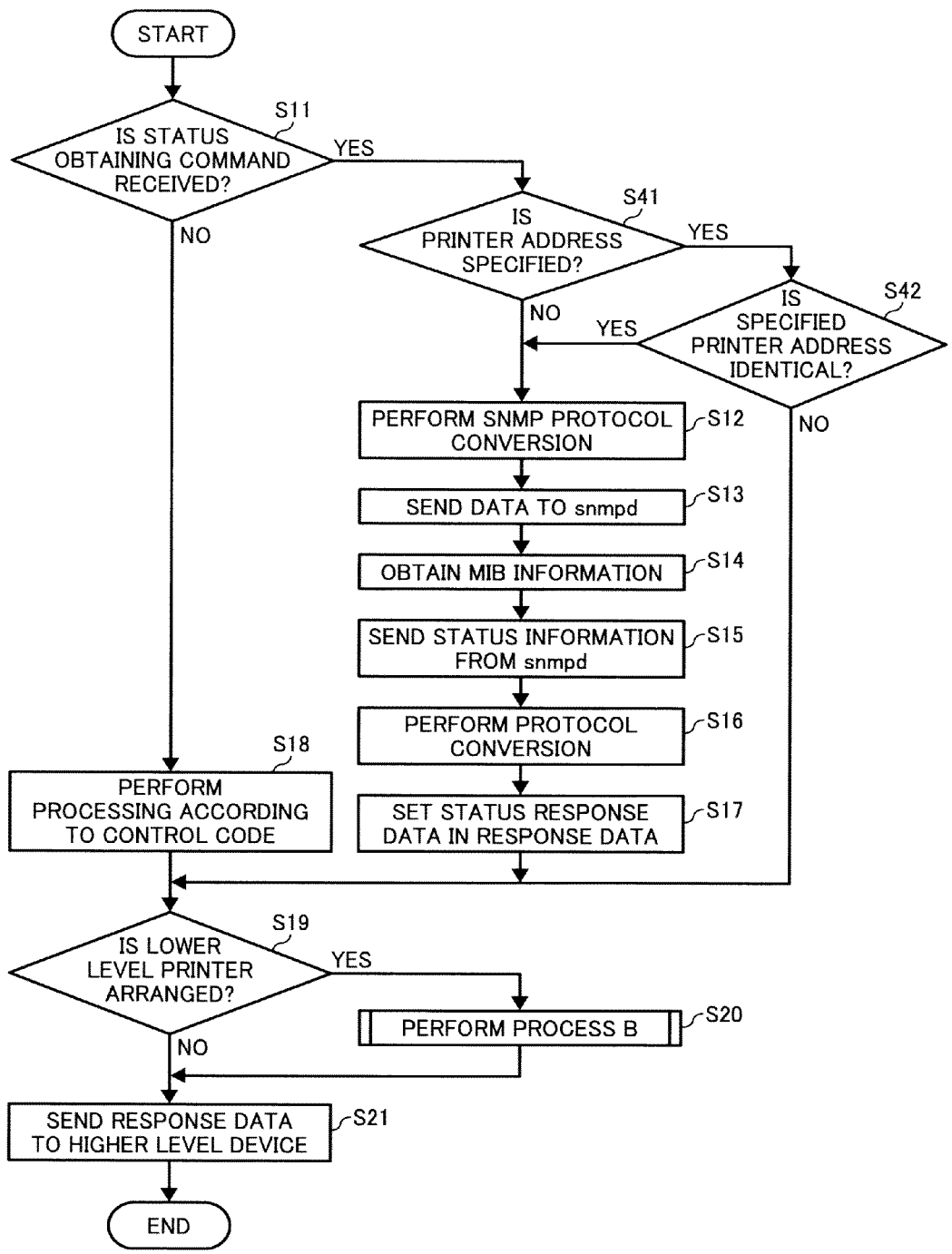
FIG. 24 is a flowchart for explaining the sequence of operations in control code processing of the control code of the predetermined protocol.
Figure 25:
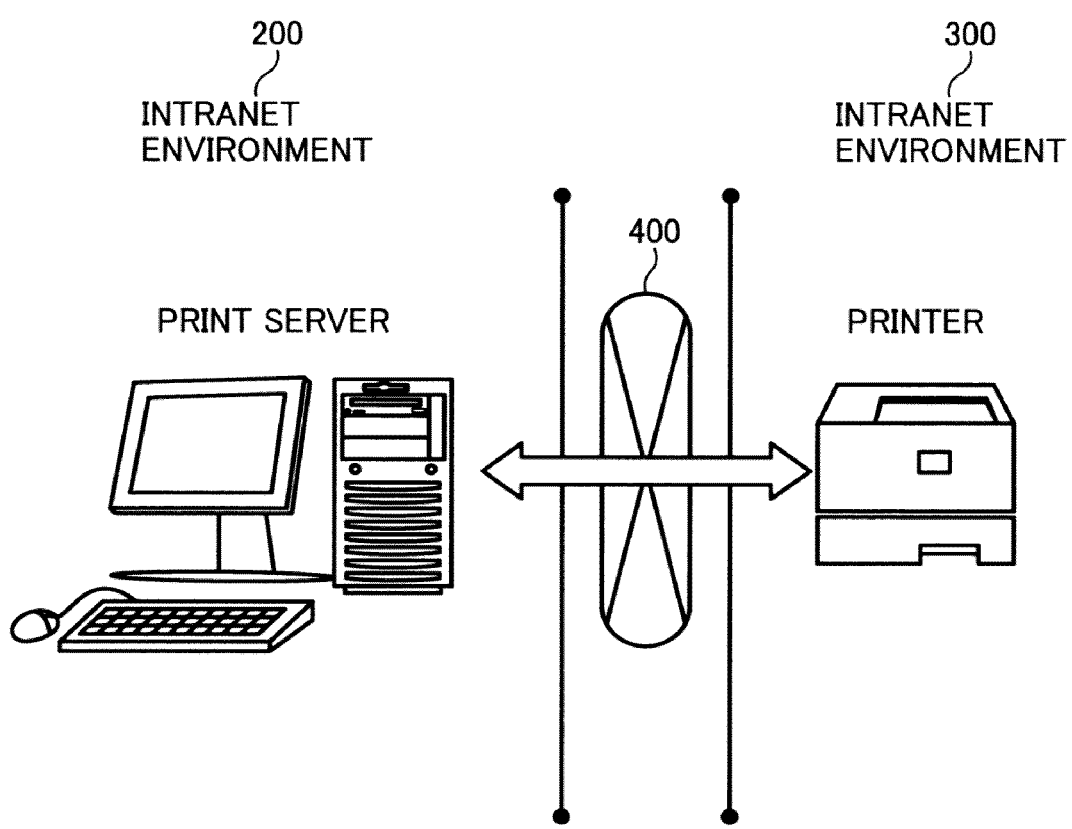
FIG. 25 is a schematic diagram for explaining a conventional network printing system.

FIG. 24 is a flowchart for explaining the sequence of operations in control code processing of the control code of the predetermined protocol. As shown in FIG. 24, if the control code is determined to be a status obtaining command (Yes at Step S11), it is determined whether printer identifying condition is specified (Step S41). For example, a condition such as a printer address can be used as the printer identifying condition.

If it is determined that a printer identifying condition such as a printer address is specified (Yes at Step S41), it is determined whether the specified printer identifying condition matches with the condition of the self printer 31 (Step S42). That is, in the example shown in FIG. 24, it is determined whether the specified printer address matches with the address of the self printer 31.

If the specified printer identifying condition is determined to match with the condition of the self printer 31 (Yes at Step S42), the process from Step S12 to Step S17 is performed to obtain the status information of the self printer 31.

On the other hand, if the specified printer identifying condition is not determined to match with the condition of the self printer 31 (No at Step S42), the process of obtaining the status information (Steps S12 to S17) is skipped and the system control proceeds directly to Step S19 (described with reference to FIG. 14).

In this way, according to the second embodiment, it is possible to obtain the status information of only a particular printer 31 from among the printers 31.

According to one aspect of the present invention, even if an error (e.g., a paper-out condition, a paper jam condition, or a toner empty condition) that typically requires user intervention for resolution occurs in an upper-level printer while printing the print data, a lower-level printer performs printing of the print data in place of the upper-level printer. Hence, the print data is printed out without fail thereby enhancing the reliability of the printing system. Moreover, because it is possible to obtain the status information of each printer in session, a printing job can be initiated after taking action (e.g., setting more paper sheets or filling toner) against potential errors that are predictable from the status information. That enhances the reliability of the printing system.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A printing apparatus that performs a printing process for a printing job including at least one print data and a series of process commands from a host apparatus, the printing apparatus comprising:
   a session setup unit that sets up a session with the host apparatus and an other printing apparatus;
   a status obtaining unit that obtains an apparatus status of the other printing apparatus that is in session with the printing apparatus; and
   a job synchronizing unit that maintains, upon performing the print process, a synchronization of the print job with the other printing apparatus that is in session with the printing apparatus, wherein the status obtaining unit includes
      a determining unit that determines whether to include a status obtaining code in control data regarding the print job from either one of an upper-level printing apparatus and the host apparatus, which is control data of a protocol other than a simple network management protocol generally used in status obtaining processing;
      a converting unit that, when the determining unit determines to include the status obtaining code in the control data, converts the status obtaining code of the protocol other than the simple network management protocol into a status obtaining code of the simple network management protocol;
      an obtaining unit that obtains management information base information representing the apparatus status based on the status obtaining code of the simple network management protocol; and
      an inverse-conversion processing unit that performs an inverse conversion of the management information base information into a response code of the protocol other than the simple network management protocol.

2. The printing apparatus according to claim 1, wherein when a lower-level printing apparatus is set, the status obtaining unit forwards the status obtaining code of the protocol other than the simple network management protocol received from either one of the upper-level printing apparatus and the host apparatus to the lower-level printing apparatus.

3. The printing apparatus according to claim 1, wherein when response data of the protocol other than the simple network management protocol is received from a lower-level printing apparatus, the status obtaining unit merges response data of the printing apparatus to received response data, and sends merged response data to either one of the upper-level printing apparatus and the host apparatus.

4. The printing apparatus according to claim 1, wherein when the determining unit determines to include the status obtaining code in the control data, the status obtaining unit obtains the apparatus status exclusively when the printing apparatus is identified by apparatus identification information appended to the status obtaining code.

5. The printing apparatus according to claim 4, wherein an apparatus address is used as the apparatus identification information.

6. A printing system in which at least two printing apparatuses are connected to a host apparatus via a network, each of the printing apparatuses performing a printing process for a printing job including at least one print data and a series of process commands from the host apparatus, the printing system comprising:
  a session setup unit that sets up a session between the host apparatus and all printing apparatuses connected to the host apparatus via the network;
  a status obtaining unit that obtains an apparatus status of each of the printing apparatuses that are in session with the host apparatus; and
  a job synchronizing unit that maintains, when a first printing apparatus is performing the printing process, a synchronization of the print job with a second printing apparatus that is in session with the first printing apparatus, wherein the status obtaining unit includes
    a determining unit that determines whether to include a status obtaining code in control data regarding the print job from either one of an upper-level second printing apparatus and the host apparatus, which is control data of a protocol other than a simple network management protocol generally used in status obtaining processing;
    a converting unit that, when the determining unit determines to include the status obtaining code in the control data, converts the status obtaining code of the protocol other than the simple network management protocol into a status obtaining code of the simple network management protocol;
    an obtaining unit that obtains management information base information representing the apparatus status based on the status obtaining code of the simple network management protocol; and
    an inverse-conversion processing unit that performs an inverse conversion of the management information base information into a response code of the protocol other than the simple network management protocol.

7. The printing system according to claim 6, wherein when a lower-level second printing apparatus is set, the status obtaining unit forwards the status obtaining code of the protocol other than the simple network management protocol received from either one of the upper-level second printing apparatus and the host apparatus to the lower-level second printing apparatus.

8. The printing system according to claim 6, wherein when response data of the protocol other than the simple network management protocol is received from a lower-level second printing apparatus, the status obtaining unit merges response data of the first printing apparatus to received response data, and sends merged response data to either one of the upper-level second printing apparatus and the host apparatus.

9. The printing system according to claim 6, wherein when the determining unit determines to include the status obtaining code in the control data, the status obtaining unit obtains the apparatus status exclusively when the first printing apparatus is identified by apparatus identification information appended to the status obtaining code.

10. The printing system according to claim 9, wherein an apparatus address is used as the apparatus identification information.

11. A non-transitory computer-readable medium having computer-readable program codes embodied in the medium for controlling a printing apparatus that performs a printing process for a printing job including at least one print data and a series of process commands from a host apparatus, the program codes when executed cause a computer to execute:
  setting up a session with the host apparatus and an other printing apparatus;
  obtaining an apparatus status of the other printing apparatus that is in session with the printing apparatus; and
  job synchronizing including, upon performing the print process, maintaining a synchronization of the print job with the other printing apparatus that is in session with the printing apparatus, wherein the obtaining step includes
    determining whether to include a status obtaining code in control data regarding the print job from either one of an upper-level printing apparatus and the host apparatus, which is control data of a protocol other than a simple network management protocol generally used in status obtaining processing;
    converting, when the determining step determines to include the status obtaining code in the control data, the status obtaining code of the protocol other than the simple network management protocol into a status obtaining code of the simple network management protocol;
    obtaining management information base information representing the apparatus status based on the status obtaining code of the simple network management protocol; and
    performing an inverse conversion of the management information base information into a response code of the protocol other than the simple network management protocol.

* * * * *